United States Patent [19]

Kashiyama et al.

[11] Patent Number: 5,113,210
[45] Date of Patent: May 12, 1992

[54] CAMERA WITH POWER ZOOM FUNCTION AND INTERCHANGEABLE LENS WITH POWER ZOOM FUNCTION

[75] Inventors: Ritsuo Kashiyama, Kawasaki; Hiroyuki Kataoka, Ohmiya, both of Japan

[73] Assignee: Canon Kabushiki Kaisha, Tokyo, Japan

[21] Appl. No.: 758,422

[22] Filed: Sep. 3, 1991

Related U.S. Application Data

[63] Continuation of Ser. No. 521,664, May 10, 1990, abandoned.

[30] Foreign Application Priority Data

| May 10, 1989 | [JP] | Japan | 1-115199 |
| May 10, 1989 | [JP] | Japan | 1-115200 |
| May 17, 1989 | [JP] | Japan | 1-123456 |
| Jul. 26, 1989 | [JP] | Japan | 1-192883 |

[51] Int. Cl.⁵ .................... G03B 7/26; G03B 13/36; G03B 5/00; G03B 9/66
[52] U.S. Cl. .................... 354/400; 354/451; 354/484; 354/152; 354/195.1; 354/173.1; 354/226
[58] Field of Search ........... 354/400, 412, 152, 195.1, 354/195.12, 173.1, 173.11, 204, 226, 468, 484, 401, 451, 452

[56] References Cited

U.S. PATENT DOCUMENTS

| Re. 30,534 | 3/1981 | Harrison | 354/195.1 X |
| 4,429,975 | 2/1984 | Shiozawa | 354/484 X |
| 4,607,931 | 8/1986 | Aihara | 354/400 |
| 4,839,677 | 6/1989 | Hoshino et al. | 354/195.1 |
| 4,887,118 | 12/1989 | Gaewsky | 354/484 X |
| 4,958,175 | 9/1990 | Asakura et al. | 354/152 |
| 4,992,821 | 2/1991 | Kiuchi et al. | 354/484 |

Primary Examiner—W. B. Perkey
Attorney, Agent, or Firm—Fitzpatrick, Cella, Harper & Scinto

[57] ABSTRACT

The present invention provides a camera system comprising: a zoom driving means driven by a battery as a power source, for varying a focal length of a taking lens; other driving means driven from the battery as a power source; a detecting means for detecting whether the other driving means are being executed or the other driving means are to be executed; and a control means for prohibiting the execution of the zoom driving means when the detecting means detects the fact that the other driving means are being executed or that the other driving means are to be executed.

41 Claims, 19 Drawing Sheets

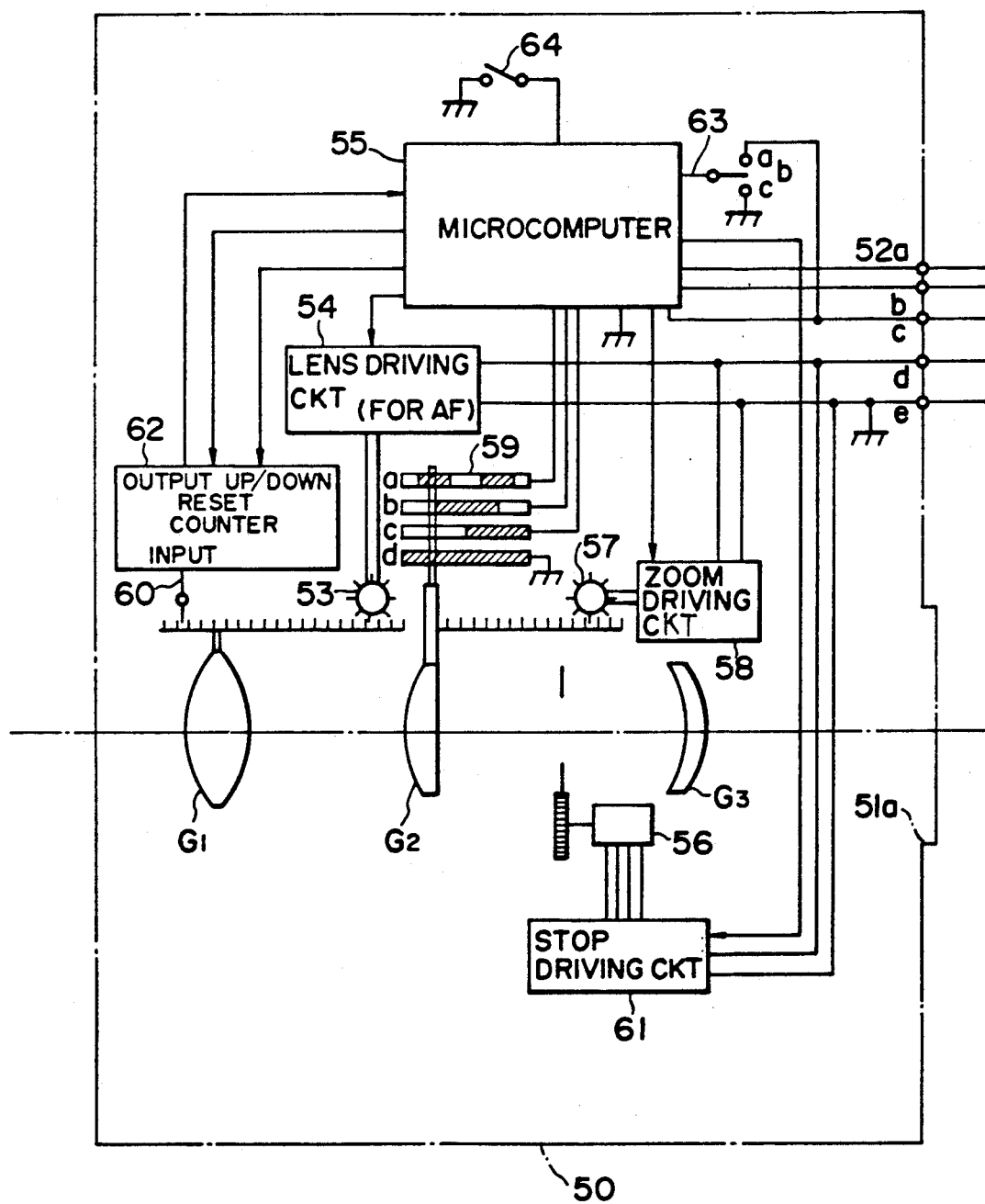

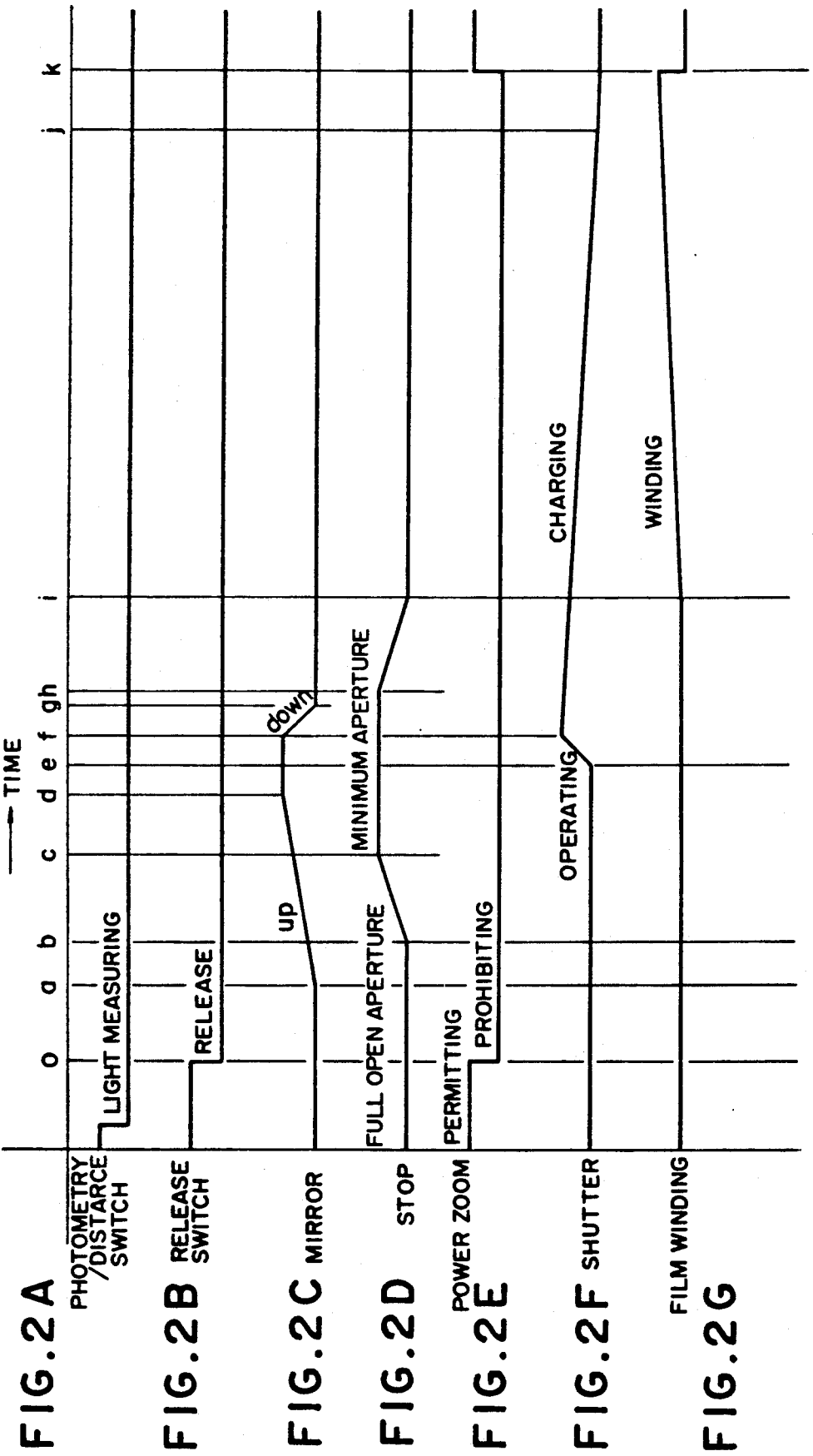

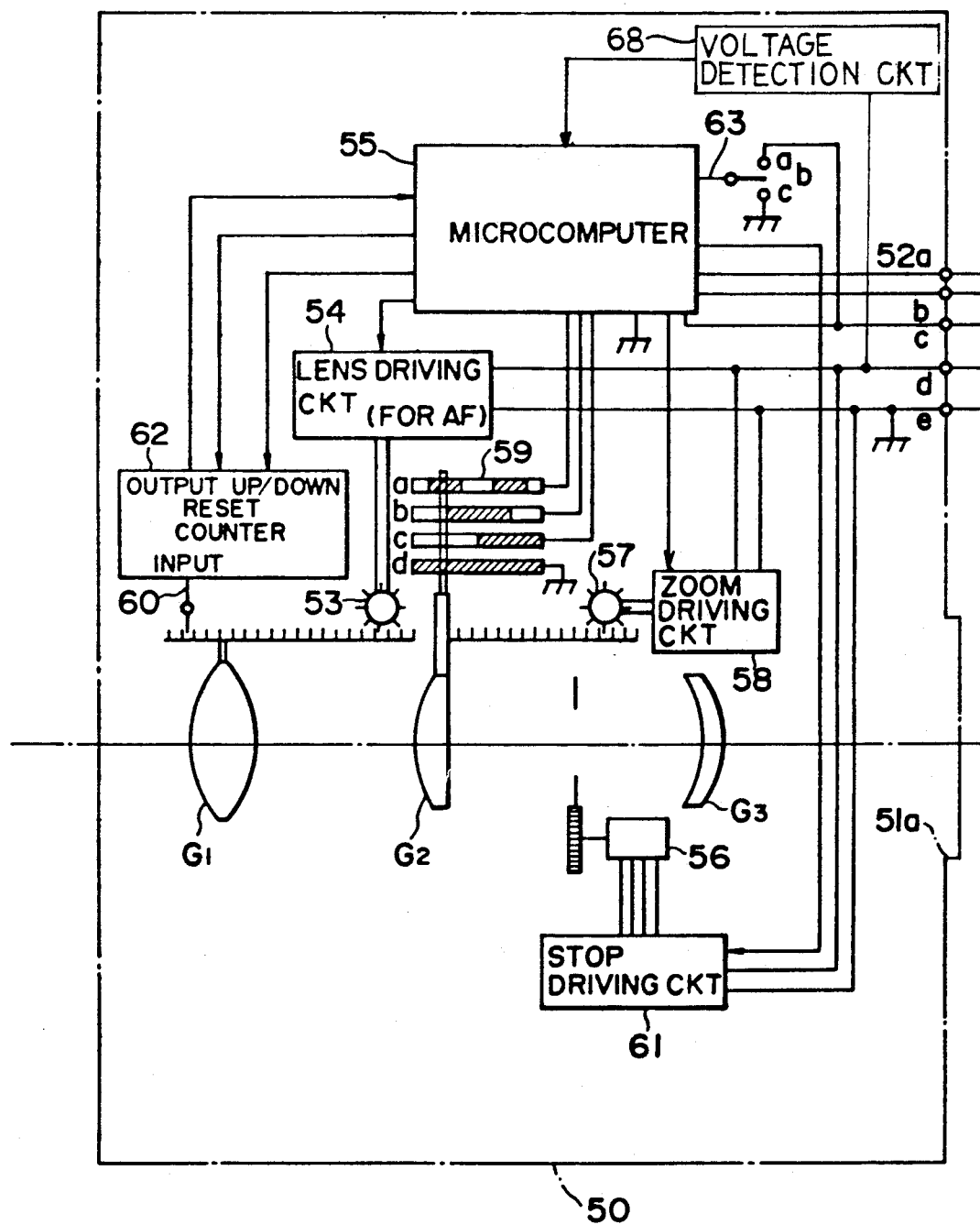

CAMERA WITH POWER ZOOM FUNCTION AND INTERCHANGEABLE LENS WITH POWER ZOOM FUNCTION

This application is a continuation of application Ser. No. 07/521,664 filed May 10, 1990, abandoned.

BACKGROUND OF THE INVENTION

1. Field of the Invention

The present invention relates to a camera with a power zoom function, an interchangeable lens with a power zoom function, and a camera body.

2. Related Background Art

Recently, the electrification of a camera system (the combination of an interchangeable lens having a power zoom function and a camera on which the interchangeable lens can be mounted) has been progressed, where various controls such as automatic exposure, winding and unwinding of a film, AF driving, stop or aperture driving, power zoom driving, and mirror-up and/or shutter charging (in case of the single lens reflex camera system) were automatically performed by using a number of motors. Accordingly, in the conventional camera systems, a large-sized batteries were used as power sources for performing such controls, with the result that the whole camera systems themselves were large-sized and weighted, thus making the transportation of the camera system difficult. Further, if a small-sized battery is utilized to make the camera system small-sized, there will arise a problem that a normal or correct photo-taking cannot be effected.

SUMMARY OF THE INVENTION

According to one aspect of this invention, the use of a small-sized battery is permitted and the compactness and/or light-weighting of a camera system can be attained, by prohibiting the power zoom driving while other driving with other function which wastes the greater current is being carried out.

According to another aspect of this invention, the use of a small-sized battery is permitted and the compactness and/or light-weighting of a camera system can be attained, by providing means for carrying out both of driving operations with the consumption current smaller than those consumed by the execution of the respective driving operations, when the power zoom driving and the AF driving are simultaneously performed.

Other objects of this invention will be apparent from the following detailed description of the invention stated hereinafter.

BRIEF DESCRIPTION OF THE DRAWINGS

FIGS. 2A to 2G are timing chart for driving the camera system of FIG. 1;

DETAILED DESCRIPTION OF THE PREFERRED EMBODIMENTS

Figure 1B:
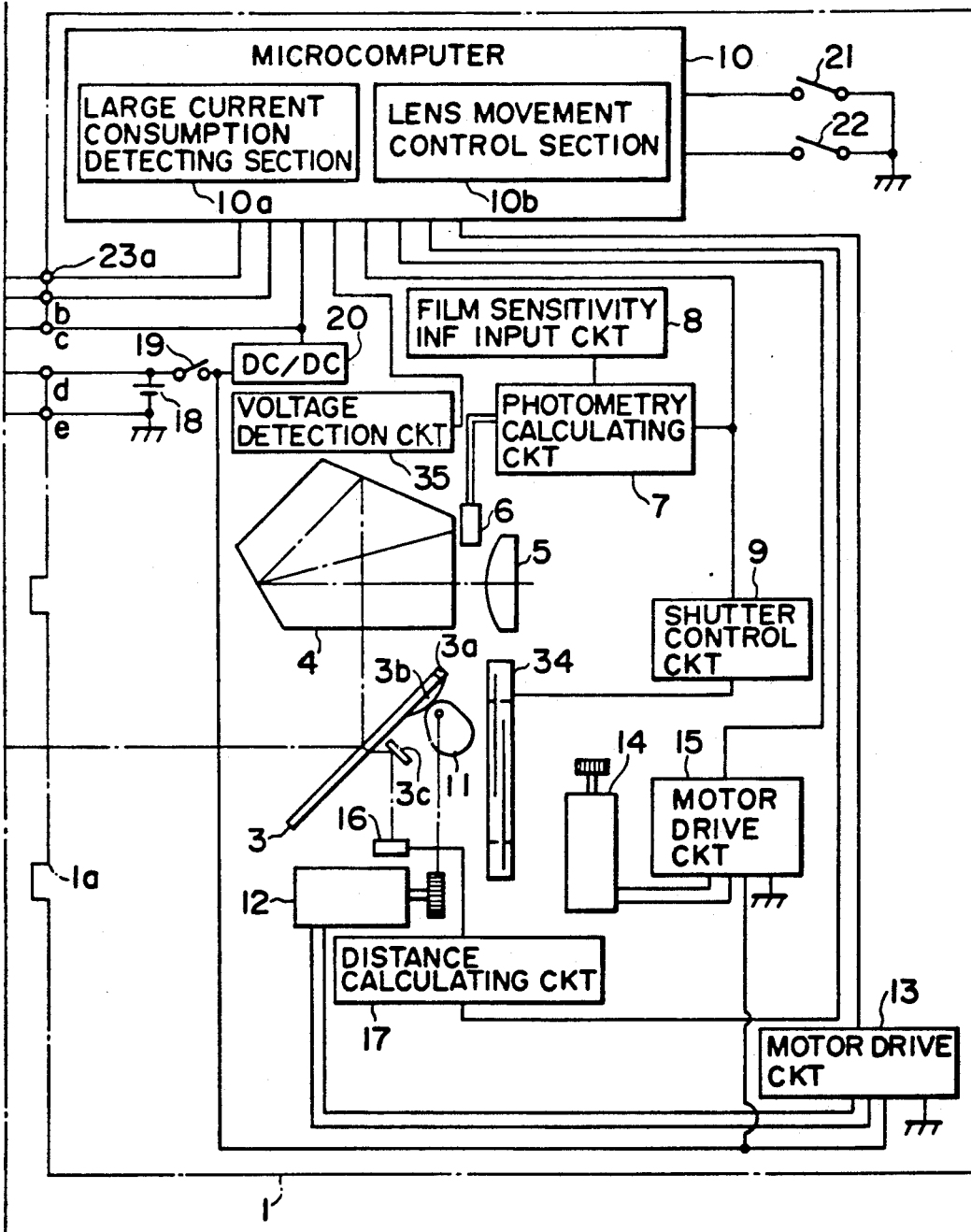
FIG. 1 shows FIGS. 1A and 1B together which is a block diagram showing a main construction of a camera system according to a preferred embodiment of the present invention.

FIG. 1 is a schematic block diagram showing a main construction of a camera system according to a preferred embodiment of the present invention. In FIG. 1, the reference numeral 1 denotes a camera body; and 50 denotes an interchangeable lens detachably mounted on the camera body. These elements 1, 50 are connected to each other by a camera mount 1a and a lens mount 51a.

Within the camera body 1, there are arranged a mirror 3, a pentagonal prism 4, an eye piece 5, a photometry light receiving element 6 and a photometry calculating circuit 7 which is connected to a film sensitive information input circuit 8, a shutter control circuit 9 and a microcomputer 10. The microcomputer 10 includes a large current consumption detecting section 10a for detecting whether a large current is consumed at the camera side, and a lens movement control section 10b for permitting and prohibiting the power zoom driving in accordance with the information from the section 10a. The reference numeral 34 denotes a focal plane shutter; 3a denotes a mirror pivot shaft; and 3b denotes a mirror actuating pin engaged by a mirror driving cam 11. The reference numeral 12 denotes a mirror driving motor connected to a motor drive circuit 13; and 14 denotes a film winding and unwinding motor connected to a motor drive circuit 15. The reference numeral 16 denotes a distance sensor connected to a distance calculating circuit 17. The reference numeral 18 denotes a battery for activating the whole camera system; 19 denotes a main power source switch; and 20 denotes a DC/DC converter connected between the battery 18 and the microcomputer 10. The reference numeral 21 denotes a photometry/distance switch; and 22 denotes a release switch. Incidentally, in general, the switches 21, 22 comprise a two-stroke switch wherein upon the first stroke of a release button the switch 21 is turned ON and upon the second stroke of the release button the switch 22 is turned ON.

The reference numerals 23a-23e denote a group of contact pins arranged at a side of the camera body 1 near the camera mount 1a; and 52a-52e denote a group of contact pins arranged at a side of the interchangeable lens 50 and corresponding to the contact pins 23a-23e at the camera body side, respectively.

At the side of the interchangeable lens 50, the reference numerals G1, G2 and G3 denote optical taking lenses; and 53 denotes a lens driving motor used for adjusting the focus of the lens, which motor is connected to a lens driving circuit 54. By rotating the lens driving motor 53, a number of pulses are inputted to a counter 62 through a ratchet 60. The reference numeral 61 denotes a stop driving circuit connected to a microcomputer 55 and to a conventional pulse motor 56 by which the stop or aperture is driven. The reference numeral 57 denotes a zoom driving motor used during the zooming operation, which motor is connected to a zoom driving circuit 58. The reference numerals 59a-59e denote an encoder for transmitting the focal length of the lens to the microcomputer 55; 63 denotes a power zoom switch; and 64 denotes a change-over switch for changing modes between the AF priority mode and the power zoom priority mode.

Next, the operation of the camera system as constructed above will be explained.

First of all, the main power source switch 19 of the camera body 1 is turned ON to energize the DC/DC converter 20. As a result, the converter 20 supplies a constant operable voltage to the microcomputer 10. Then, when the photometry/distance switch 21 is depressed, the light amount detected by the photometry light receiving element 6 is transmitted to the photometry calculating circuit 7, thereby storing the exposure amount in a known manner. Further, since the photometry/distance switch 21 serves also as a trigger switch for the auto-distance, when the photometry/distance switch 21 is depressed, the distance sensor 16 is activated in response to the command from the microcomputer 10, thereby performing the distance calculation by means of the distance calculating circuit 17, determining the feeding amount of the lens, performing the conventional serial communication with the microcomputer 55 at the interchangeable lens side, and transmitting the rotational direction of the lens driving motor 53 to the lens driving circuit 54 to shift the optical taking lens G1 in a known manner. At the same time, the contents of the counter 62 is varied through the ratchet 60 in response to the movement of the optical taking lens G1. However, since the microcomputer 55 can detect the shifting amount of the lens by reading the number of pulses counted by the counter, the optical taking lens G1 can be shifted in accordance with the shifting amount of the lens commanded from the camera body side as mentioned above, and can be stopped at a focused position. Generally, the distance determining operation is performed once more, and, when the focused condition is ascertained, the focus indication such as visual indication or audible indication is given at the camera body side 1.

Next, a further operation will be explained with reference to a timing chart shown in FIG. 2. Incidentally, it should be noted that the previous operation as mentioned above was performed prior to the "0" point shown in FIG. 2. In FIG. 2, the abscissa indicates "time" and the ordinate indicates "items".

At the 0 point in FIG. 2, when the release switch 22 is depressed, the microcomputer energizes the motor drive circuit 13 to rotate the mirror driving motor 12, thereby rotating the mirror actuating cam 11 to lift the actuating pin 3b (a point "a" in FIG. 2), whereby the mirror is lifted and hold at that position (a point "d" in FIG. 2). At a point "b" having a given time delay from the point "a", the conventional serial communication is performed between the microcomputer 10 at the camera body side and the microcomputer 55 at the lens side through the groups of contact pins 23a, 23b, 52a, 52b, thereby demanding the stop (aperture) setting value according to the photometry amount to the lens side. The stop setting value demanded by the camera body 1 is used in the stop driving circuit 61 as a signal for controlling the pulse motor 56. In this case, the reason why where is a given time delay between the point at which the lifting movement of the mirror is started (the point "a" in FIG. 2) and the point at which the stop is started to be driven (the point "b" in FIG. 2) is that, since the large current flows through the mirror driving motor 12 immediately after the power source switch has been turned ON, the stop driving operation should be inhibited during that period, thereby utilizing the limited power source more effectively.

Incidentally, the duration between the points "b" and "c" indicates the time when the stop-down of the stop is being effected; the point "c" indicates the time point when the stop-down has just been finished; and the duration between points "e" and "f" indicates the shutter time (seconds) controlled by the calculated result by means of the photometry calculating circuit 7 upon opening of the shutter. The duration between the points "f" and "g" given after the shutter operation has just been finished indicates the time when the mirror is being lowered; and the duration between points "h" and "i" indicates the time when the stop is returned to the full-aperture. Further, the mirror driving motor 12 serves also as a mechanical charging means for the focal plane shutter 34, and is operated up to a point "j". The completion of the stop driving (point "l") is transmitted to the microcomputer 10 at the camera body side 1 through the microcomputer 55, whereby the driving command is emitted to the motor drive circuit 15, thus winding a film through the film winding and unwinding motor 14. The winding of the film is finished at a point "k", with the result that the sequence of the camera is returned to the original condition, and the photometry/distance operation is repeated.

In the illustrated embodiment, the power zoom is not driven during the time duration between the points 0 and "k" on the basis of the information from the camera side 1 to the interchangeable lens side 50 (through the conventional serial communication), for example, even if the power zoom switch 63 is depressed.

Next, the operation at the interchangeable lens side 50 will be explained.

Figure 3:
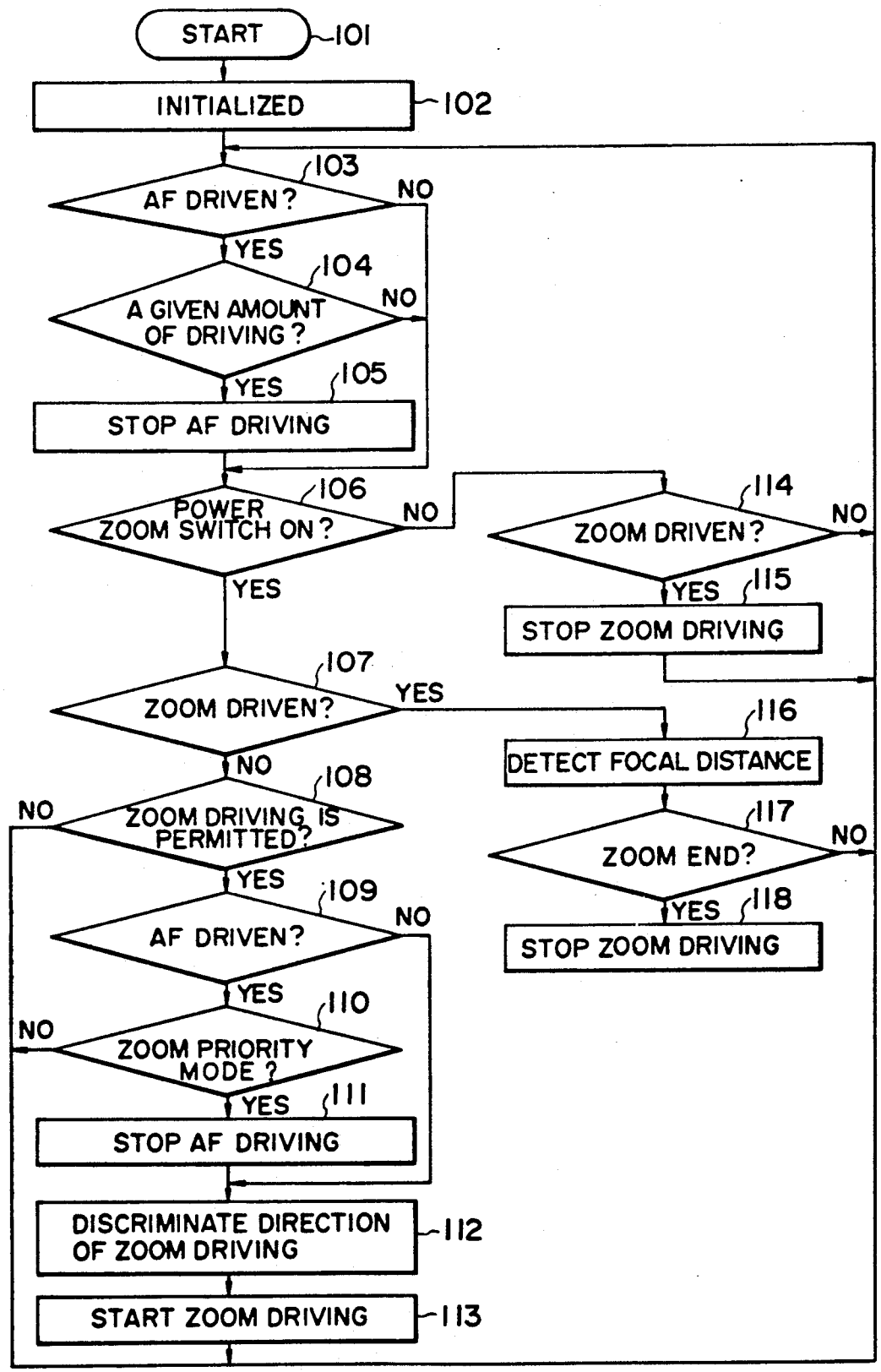
FIGS. 3 to 6 are flow charts showing the operation of the camera system of FIG. 1 at an interchangeable lens side.

FIG. 3 shows a main flow chart of the microcomputer 55 at the interchangeable lens side 50.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed or not. If the AF driving is being performed, the sequence goes to a step 104, otherwise, to a step 106.

In the step 104, the value in the counter is read to determine the AF driving amount, and the read value is compared with a desired AF driving amount sent from the camera body side 1. If the read value reaches the desired amount, the sequence goes to a step 105 where the AF driving is stopped, and then goes to the step 106. On the other hand, if the read value does not reach the desired AF driving amount, the sequence goes to the step 106.

In the step 106, the condition of the power zoom switch 63 is judged, and if the switch is turned ON either a side or o side, the sequence goes to a step 107; whereas, if the switch is turned OFF, the sequence goes to a step 114.

In the step 114, it is judged whether the zoom driving is being performed or not. If the zoom driving is not performed, the sequence returns to the step 103 and the operations mentioned above is repeated. On the other hand, if the zoom driving is being performed, the sequence goes to a step 115 where the zoom driving is stopped, and then returns to the step 103.

If the power zoom switch is turned ON in the step 106, the sequence goes to the step 107, where it is judged whether the zoom driving is being performed or not. If the zoom driving is being performed, the sequence goes to a step 116 where the focal length is detected from the encoder 59 for detecting the focal length of the lens, and then goes to a step 117.

In the step 117, if the focal length being detected is situated in the zoom end toward which the zoom driving is directed, since a further zoom driving cannot be effected, the sequence goes to a step 118 where the zoom driving is stopped, and then returns to the step 103. On the other hand, if the focal length is not situated in the zoom end toward which the zoom driving is directed, the zoom driving is further continued, and then the sequence returns to the step 103.

If the zoom driving is not performed in the step 107, the sequence goes to a step 108 to initiate the zoom driving.

In the step 108, it is judged whether the zoom driving is permitted or not from a condition of a zoom permission flag in the microcomputer 55. If the zoom driving is permitted, the sequence goes to a step 109; whereas, if not permitted, the sequence returns to the step 103 without performing the zoom driving.

In the step 109, it is judged whether the AF driving is being performed or not. If the AF driving is not performed, the sequence goes to a step 112; whereas, if the AF driving is being performed, the sequence goes to a step 110.

In the step 110, a condition of the change-over switch 64 is detected and it is judged whether the AF priority mode or the zoom priority mode is available. If the AF priority mode is available, the AF driving is continued without performing the zoom driving, and then the sequence returns to the step 103. On the other hand, if the zoom priority mode is available, the sequence goes to a step 111 where the AF driving is stopped, and then the sequence goes to the step 112.

In the step 112, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 113.

In the step 113, the zoom driving is initiated to the driving direction determined in the step 112. Then the sequence returns to the step 103, and the sequential operations described above are repeated.

Next, the operation at the initiation of the AF driving will be explained.

When the microcomputer 55 at the interchangeable lens side 50 receives the AF driving command and the AF driving amount from the microcomputer 10 at the camera body side 1 through the communication therebetween, the microcomputer 55 initiates the AF driving by using a known offering technique.

Figure 4:
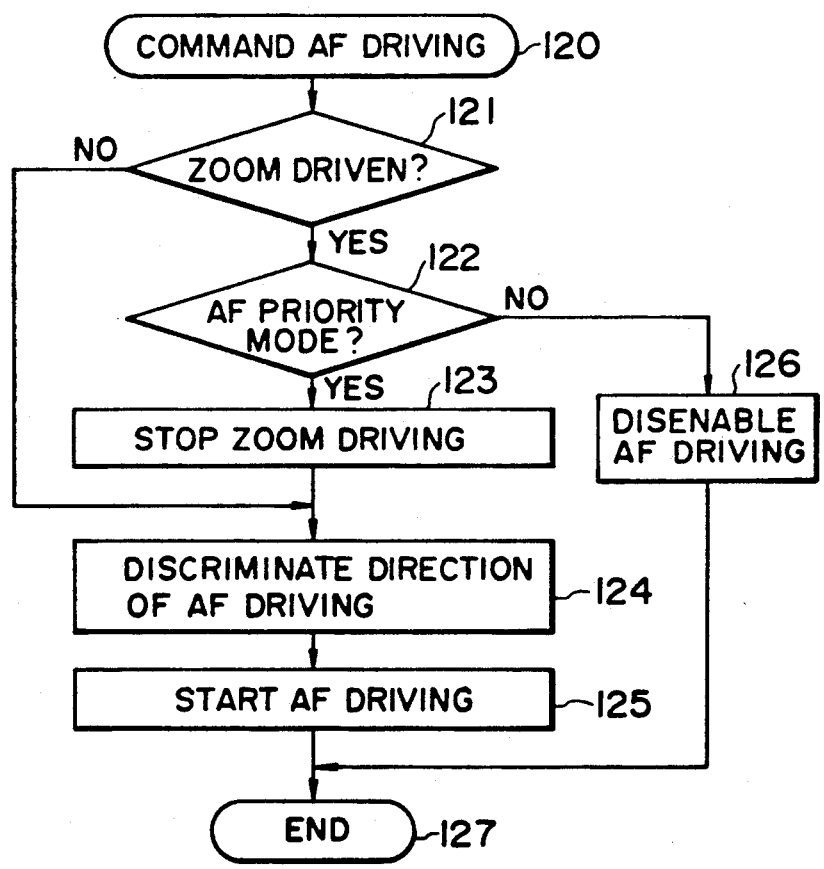

FIG. 4 is a flow chart showing the offering operation regarding the AF driving command.

In a step 120, when the offering of the AF driving command is entered, the sequence goes to a step 121, where it is judged whether the zoom driving is being performed or not. If the zoom driving is not performed, the sequence goes to a step 124, whereas, if the zoom driving is being performed, the sequence goes to a step 122.

In the step 122, the condition of the power zoom switch 63 is discriminated, and, if the zoom priority mode is available, since the AF driving cannot be performed, the sequence goes to a step 126, where the fact that the zoom priority mode is available and the zoom driving is being performed and the AF driving cannot be performed is transmitted to the microcomputer 10 at the camera body side 1 through the communication, and then the sequence goes to a step 127 where the offering operation is finished. On the other hand, if the AF priority mode is available in the step 122, the sequence goes to a step 123, where the zoom driving is stopped, and then the sequence goes to the step 124.

In the step 124, the driving direction information sent from the camera body side 1 is discriminated, and then the sequence goes to a step 125, where the AF driving is started. Therefore, the sequence goes to the step 127, thus finishing the offering operation.

Next, the operation regarding the permission and prohibition of the zoom driving will be explained.

With respect to the prohibition and permission of the zoom driving, in order to prohibit the zoom driving while the camera body 1 is performing the operations from the point 0 the point "k" shown in FIG. 2, when the fact that the camera body is performing such operations is detected by the large current consumption detecting section 10a, the lens movement control section 10b in the microcomputer 10 at the camera body side 1 sends the zoom driving prohibition signal to the microcomputer 55 of the interchangeable lens side 50 at the point 0 in FIG. 2, and sends the zoom driving permission signal to the microcomputer 55 at the point "k" in FIG. 2. The microcomputer 55 at the interchangeable lens side 50 treats these signals in a known offering technique.

Figure 5:
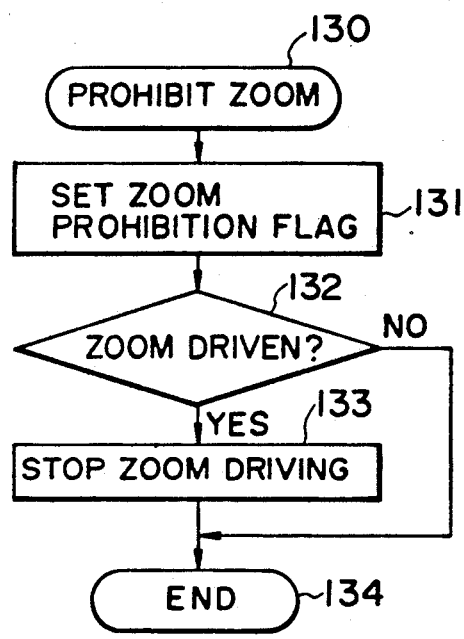

FIG. 5 is a flow chart showing the operation of the microcomputer 55 of the interchangeable lens side 50 when it receives the zoom driving prohibition signal.

When the microcomputer 55 receives the zoom driving inhibition signal in a step 130, the sequence goes to a step 131, where a zoom prohibition flag in the microcomputer is set.

Then, the sequence goes to a step 132, where it is judged whether the zoom driving is being performed or not. If the zoom driving is not performed, the sequence goes to a step 134, where the offering operation is finished. On the other hand, if the zoom driving is being performed, the sequence goes to a step 133, where the zoom driving is stopped, and then goes to the step 134, thus finishing the offering operation.

Figure 6:
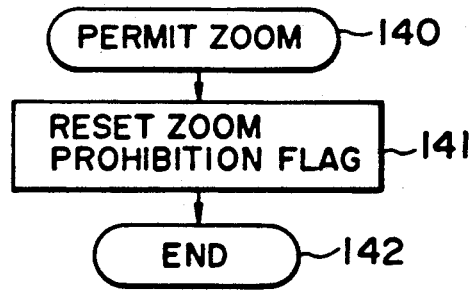

FIG. 6 is a flow chart for explaining the operation of the microcomputer 55 of the interchangeable lens side 50 when it receives the zoom driving permission signal.

When the microcomputer 55 receives the zoom driving permission signal in a step 140, the sequence goes to a step 141, where a zoom prohibition flag in the microcomputer is reset. Then, the sequence goes to a step 142, where the offering operation is finished.

Now, when the zoom prohibition flag is reset, if the power zoom switch has been turned ON, the zoom driving is initiated as mentioned above.

In the conventional camera system, when the interchangeable lens is mounted on the camera with the power zoom function using the smaller battery for the portable convenience, the camera sometimes cannot be operated correctly because it is necessary to provide the large electric power for performing the power zoom driving. To the contrary, according to the illustrated embodiment of the present invention, since the power zoom driving is prohibited while the large current is consumed in the camera body side such as in the case of the release operation, shutter charging operation and/or film feeding operation, it is possible to make the camera system small-sized without loosing the portable convenience. Further, with this arrangement (i.e., the phototaking is permitted without performing the power zoom driving), the camera system consumes the less energy, thus increasing the number of pictures to be taken. Further, since the power zoom driving is inhibited during the release operation, the obtained pictures are not unpinted ones.

In the illustrated embodiment, while the camera system comprising the interchangeable lens having the power zoom function and the camera was explained, the present invention may be adapted to a camera into which a lens having a power zoom function is incorporated. Further, while an example that the means for discriminating the large current consumption operations such as AF driving, stop driving, film feeding and the like and the means for prohibiting the power zoom driving accordingly are arranged at the camera body was explained, the camera body side may include a battery used as a common power source and the interchangeable lens side may includes such means.

As mentioned above, according to the illustrated embodiment, since the power zoom driving is prohibited while the driving which consumes the large current, such as the AF driving, stop driving and film feeding is being performed, thereby using the small battery effectively, the providing the detecting means for judging whether any driving, other than the power zoom driving, which consumes the large current is being performed, and the operation control means for prohibiting the power zoom driving when the fact that any driving which consumes the large current is being performed is detected by the detecting means, it is possible to the normal photo-taking and to make the camera system more small-sized and lighter.

Figure 7A:
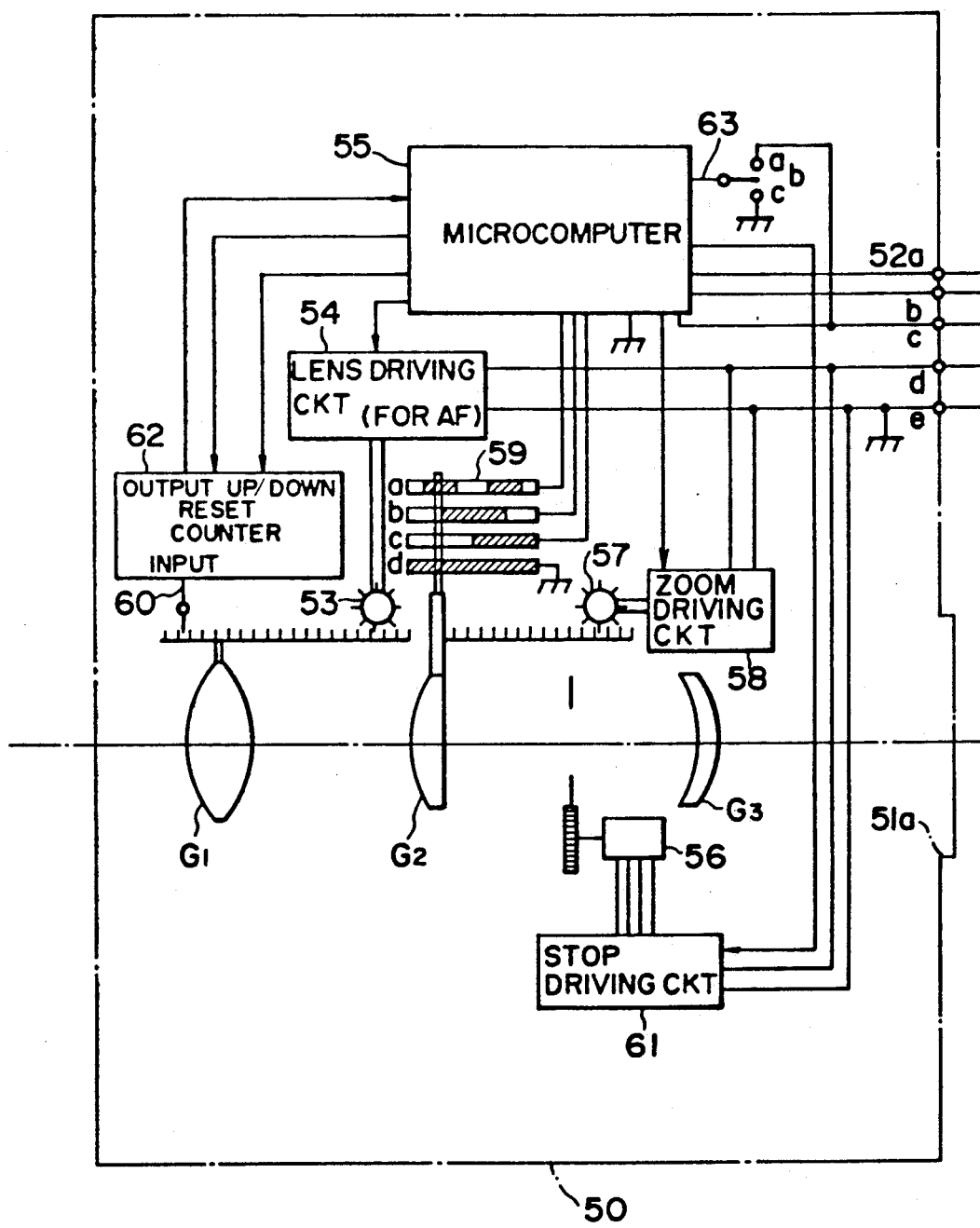
FIG. 7 shows FIGS. 7A and 7B together which is a block diagram showing a main construction of a camera system according to a second embodiment of the present invention.
Figure 7B:
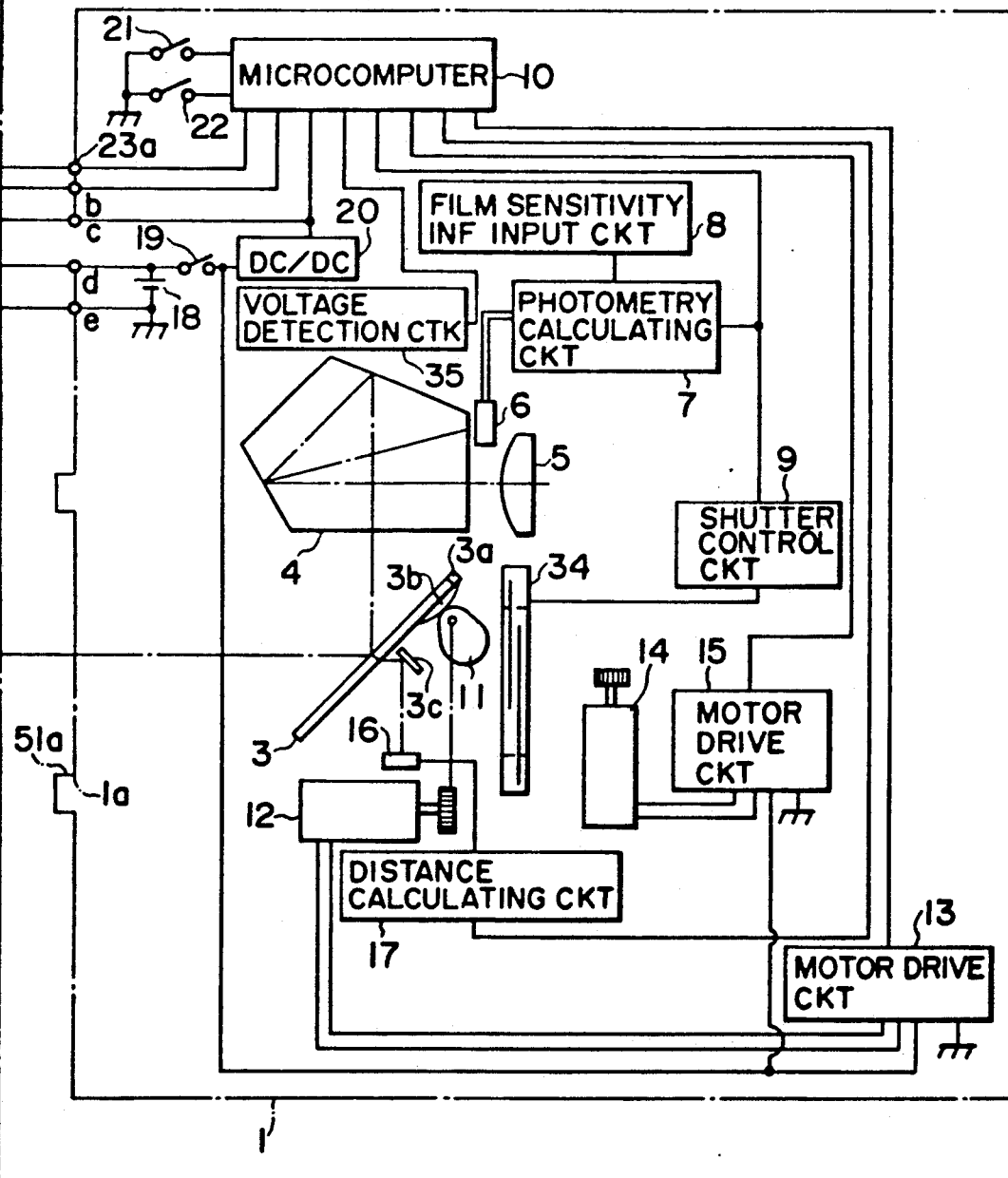

FIG. 7 is a schematic block diagram showing a main construction of a camera system according to a second embodiment of the present invention. Incidentally, the construction of FIG. 7 differs from that of FIG. 1 in the point that the microcomputer 10 of the camera body 1 does not include the large current consumption detecting section 10a and the lens movement control section 10b and that the change-over switch 64 for the interchangeable lens 50 is omitted.

Next, the operation of the camera system as constructed above will be explained.

First of all, the main power source switch 19 of the camera body 1 is turned ON to energize the DC/DC converter 20. As a result, the converter 20 supplies a constant operable voltage to the microcomputer 10. Then, when the photometry/distance switch 21 is depressed, the light amount detected by the photometry light receiving element 6 is transmitted to the photometry calculating circuit 7, thereby storing the exposure amount in a known manner. Further, since the photometry/distance switch 21 serves also as a trigger switch for the autodistance, when the photometry/distance switch 21 is depressed, the distance sensor 16 is activated in response to the command from the microcomputer 10, thereby performing the distance calculation by means of the distance calculating circuit 17, determining the feeding amount of the lens, performing the conventional serial communication with the microcomputer 55 at the interchangeable lens side, and transmitting the rotational direction of the lens driving motor 53 to the lens driving circuit 54 to shift the optical taking lens G1 in a known manner. At the same time, the contents of the counter 62 is varied through the ratchet 60 in response to the movement of the optical taking lens G1. However, since the microcomputer 55 can detect the shifting amount of the lens by reading the number of pulses counted by the counter, the optical taking lens G1 can be shifted in accordance with the shifting amount of the lens commanded from the camera body side as mentioned above, and can be stopped at a focused position. Generally, the distance determining operation is performed once more, and, when the focused condition is ascertained, the focus indication such as visual indication or audible indication is given at the camera body side 1.

Incidentally, in the second embodiment, the timing of various operations are the same as those of the previous embodiment shown in FIG. 2, and, thus, the timing of the operations of the camera system of FIG. 7 will be omitted.

The aim of this second embodiment is that the lens driving motor 53 and the zoom driving motor 57 are controlled to be energized alternately, when the power zoom switch is being changed at the a side or at the c side, during the AF driving (i.e., while the lens driving motor 53 is being rotated). Since a motor has the moment of rotation inherently, if the motor is stopped for a short time, the motor continues to rotate, and, accordingly, the above control does not affect the operation of the motor. For example, the lens driving motor 53 and the zoom driving motor 57 may be energized alternately every 10 ms (in general, this control is called as "duty control"). Therefore, the electric power consumed when these motors are rotated is substantially equal to the electric power consumed if either motor is continuously rotated.

Next, the operation at the interchangeable lens side 50 will be explained with reference to a flow chart.

Figure 8:
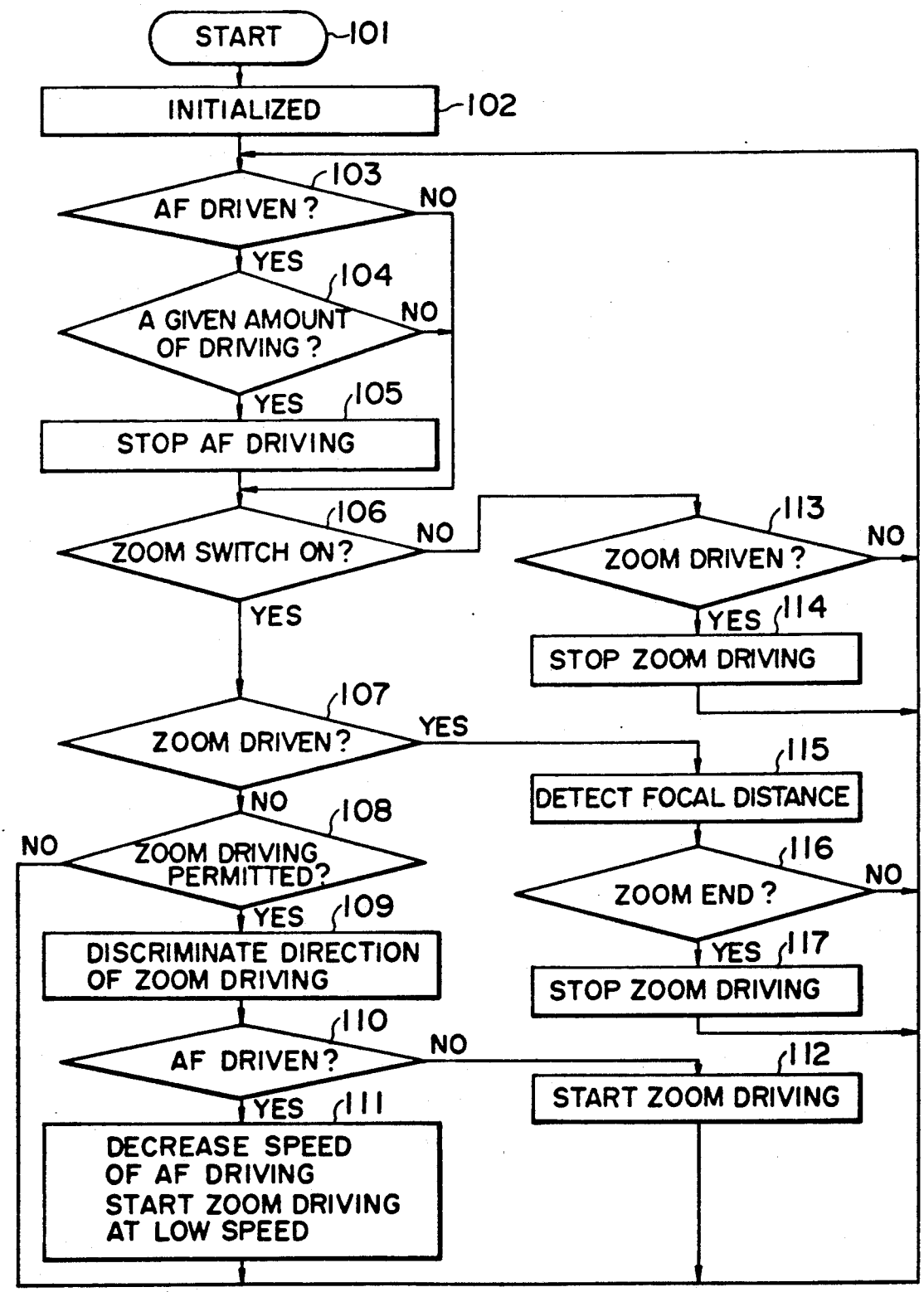
FIG. 8 to 11 are flow charts showing the operation of the camera system of FIG. 7 at an interchangeable lens side.

FIG. 8 shows a main flow chart of the microcomputer 55 at the interchangeable lens side 50.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed or not. If the AF driving is being performed, the sequence goes to a step 104, otherwise, to a step 106.

In the step 104, the value in the counter is read to determine the AF driving amount, and the read value is compared with a desired AF driving amount sent from the camera body side 1. If the read value reaches the desired amount, the sequence goes to a step 105 where the AF driving is stopped, and then goes to the step 106.

On the other hand, if the read value does not reach the desired AF driving amount, the sequence goes to the step 106.

In the step 106, the condition of the power zoom switch 63 is judged, and if the switch is turned ON either a side or c side, the sequence goes to a step 107; whereas, if the switch is turned OFF, the sequence goes to a step 113.

In the step 113, it is judged whether the zoom driving is being performed or not. If the zoom driving is not performed, the sequence returns to the step 103 and the operations mentioned above is repeated. On the other hand, if the zoom driving is being performed, since the power zoom switch is turned OFF, the sequence goes to a step 114 where the zoom driving is stopped, and then returns to the step 103.

If the power zoom switch is turned ON in the step 106, the sequence goes to the step 107, where it is judged whether the zoom driving is being performed or not. If the zoom driving is being performed, the sequence goes to a step 115 where the focal length is detected from the encoder 59 for detecting the focal length of the lens, and then goes to a step 116.

In the step 116, if the focal length being detected is situated in the zoom end toward which the zoom driving is directed, since a further zoom driving cannot be effected, the sequence goes to a step 117 where the zoom driving is stopped, and then returns to the step 103. On the other hand, if the focal length is not situated in the zoom end toward which the zoom driving is directed, the zoom driving is further continued, and then the sequence returns to the step 103.

If the zoom driving is not performed in the step 107, the sequence goes to a step 108 to initiate the zoom driving.

In the step 108, it is judged whether the zoom driving is permitted or not from a condition of a zoom permission flag in the microcomputer 55. If the zoom driving is permitted, the sequence goes to a step 109; whereas, if not permitted, the sequence returns to the step 103 without performing the zoom driving.

In the step 109, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 110.

In the step 110, it is judged whether the AF driving is being performed or not. If the AF driving is not performed, the sequence goes to a step 112; whereas, if the AF driving is being performed, the sequence goes to a step 111.

In the step 111, in order to perform the AF driving and the zoom driving simultaneously, the AF driving motor 53 and the zoom driving motor 57 are energized alternately, thereby decreasing the speed of the AF driving so that the zoom driving is started to the direction determined in the step 109, and then the sequence returns to the step 103, from where the operations mentioned above are repeated.

In the step 112, since only the zoom is effected, the zoom driving motor 57 is always energized (it means that the duty control is not effected), whereby the zoom driving is started to the direction determined in the step 109 at a speed faster than a speed at which the AF driving and the zoom driving are simultaneously performed. Thereafter, the sequence returns to the step 103.

Figure 9:
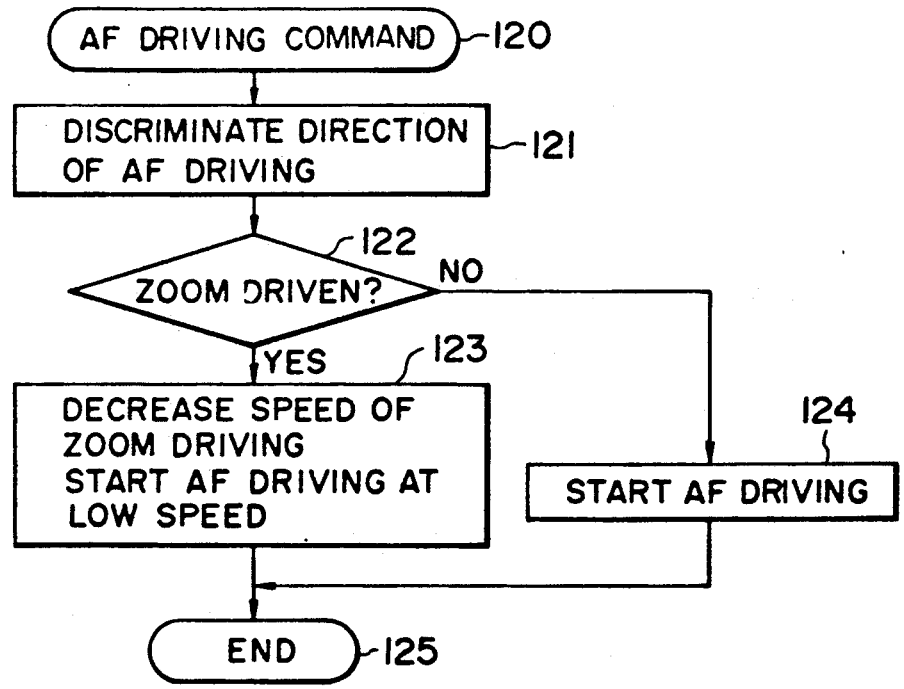

Next, the operation at the initiation of the AF driving will be explained with reference to a flow chart shown in FIG. 9.

When the microcomputer 55 at the interchangeable lens side 50 receives the AF driving command and the AF driving amount from the microcomputer 10 at the camera body side 1 through the communication therebetween, the microcomputer 55 initiates the AF driving by using a known offering technique.

In a step 120, when the offering of the AF driving command is entered, the sequence goes to a step 121 where the driving direction sent from the camera body side 1 is judged, and then goes to a step 122. In the step 122, it is judged whether the zoom driving is being performed or not. If the zoom driving is not performed, the sequence goes to a step 124, whereas, if the zoom driving is being performed, the sequence goes to a step 123.

In the step 123, in order to perform the AF driving and the zoom driving simultaneously, the AF driving motor 53 and the zoom driving motor 57 are energized alternately, thereby decreasing the speed of the AF driving so that the AF driving is started at a low speed to the direction determined in the step 121, and then the sequence goes to the step 125, where the offering operation is finished.

On the other hand, in the step 124, since only the zoom is effected, the zoom driving motor 57 is always energized, whereby the AF driving is started to the direction determined in the step 121 at a speed faster than a speed at which the AF driving and the zoom driving are simultaneously performed. Thereafter, the sequence goes to the step 125, thus finishing the offering operation.

Next, the operation regarding the permission and prohibition of the zoom driving will be explained.

With respect to the prohibition and permission of the zoom driving, in order to prohibit the zoom driving while the camera body 1 is performing the operations from the point 0 to the point "k" shown in FIG. 2, the microcomputer 10 at the camera body side 1 sends the zoom driving prohibition signal to the microcomputer 55 of the interchangeable lens side 50 at the point 0 in FIG. 2, and sends the zoom driving permission signal to the microcomputer 55 at the point "k" in FIG. 2. The microcomputer 55 at the interchangeable lens side 50 treats these signals in a known offering technique.

Figure 10:
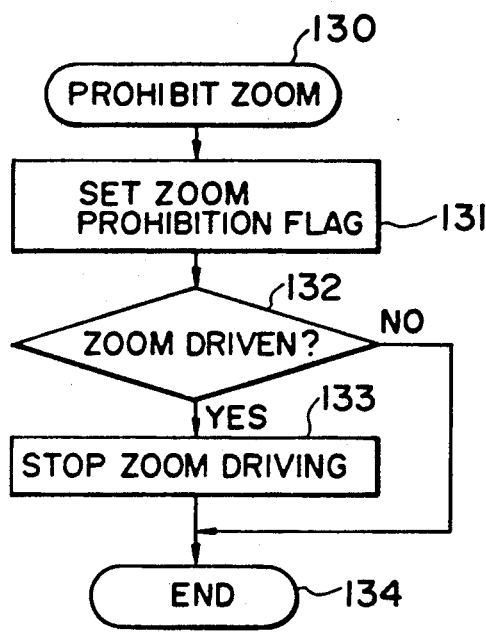

FIG. 10 is a flow chart showing the operation of the microcomputer 55 of the interchangeable lens side 50 when it receives the zoom driving prohibition signal.

When the microcomputer 55 receives the zoom driving inhibition signal in a step 130, the sequence goes to a step 131, where a zoom prohibition flag in the microcomputer is set.

Then, the sequence goes to a step 132, where it is judged whether the zoom driving is being performed or not. If the zoom driving is not performed, the sequence goes to a step 134, where the offering operation is finished. On the other hand, if the zoom driving is being performed, the sequence goes to a step 133, where the zoom driving is stopped, and then goes to the step 134, thus finishing the offering operation.

Figure 11:
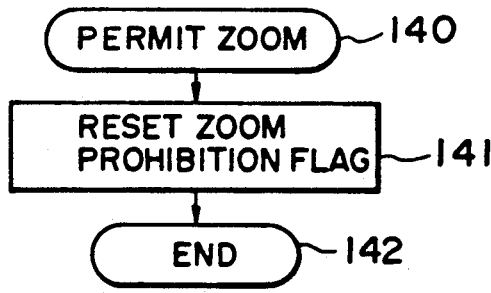

FIG. 11 is a flow chart for explaining the operation of the microcomputer 55 of the interchangeable lens side 50 when it receives the zoom driving permission signal.

When the microcomputer 55 receives the zoom driving permission signal in a step 140, the sequence goes to a step 141, where a zoom prohibition flag in the microcomputer is reset. Then, the sequence goes to a step 142, where the offering operation is finished.

Now, when the zoom prohibition flag is reset, if the power zoom switch 63 has been turned ON, the zoom driving is initiated as mentioned above.

Figure 12A:
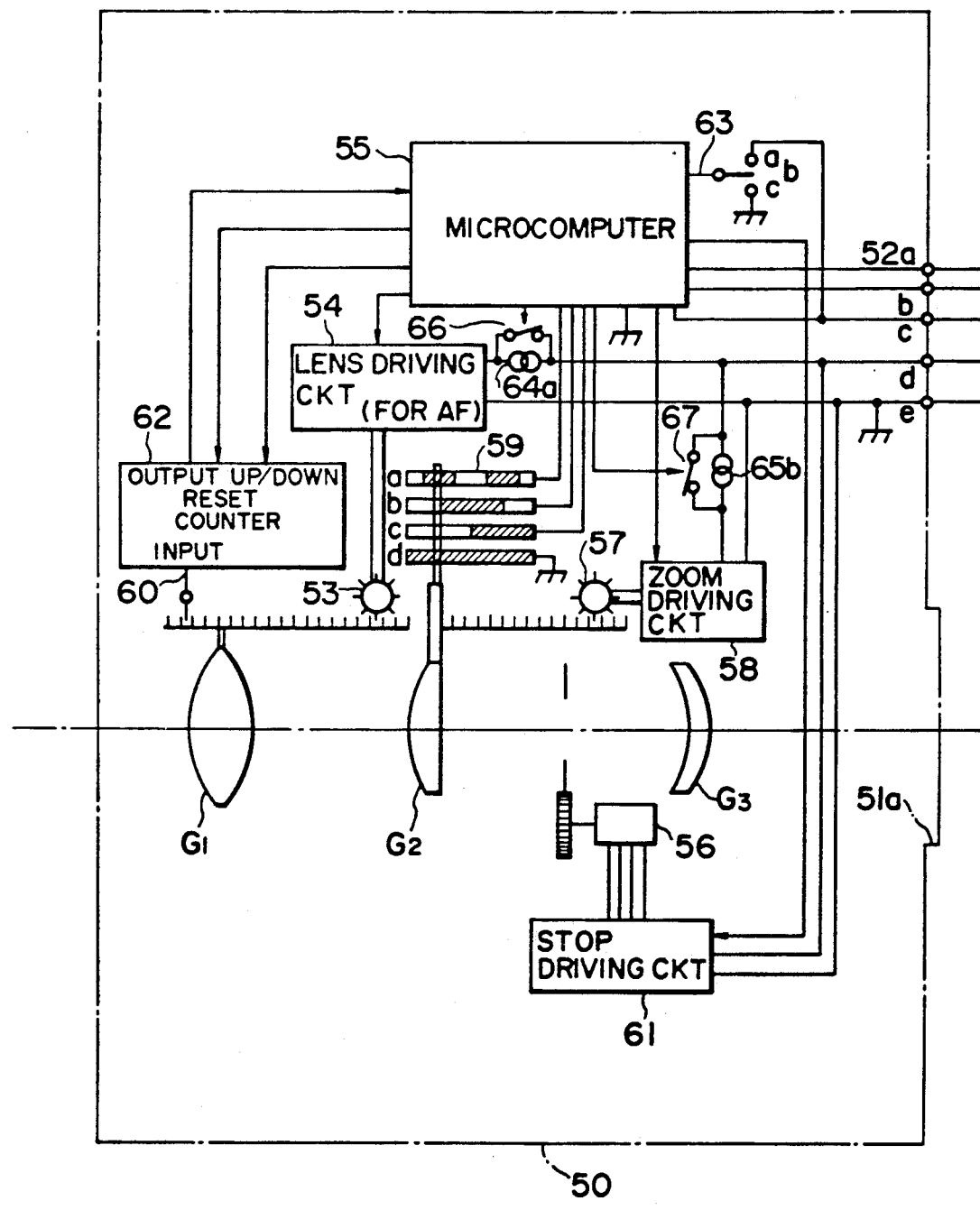
FIG. 12 shows FIGS. 12A and 12B together which is a block diagram showing a main construction of a camera system according to a third embodiment of the present invention.
Figure 12B:
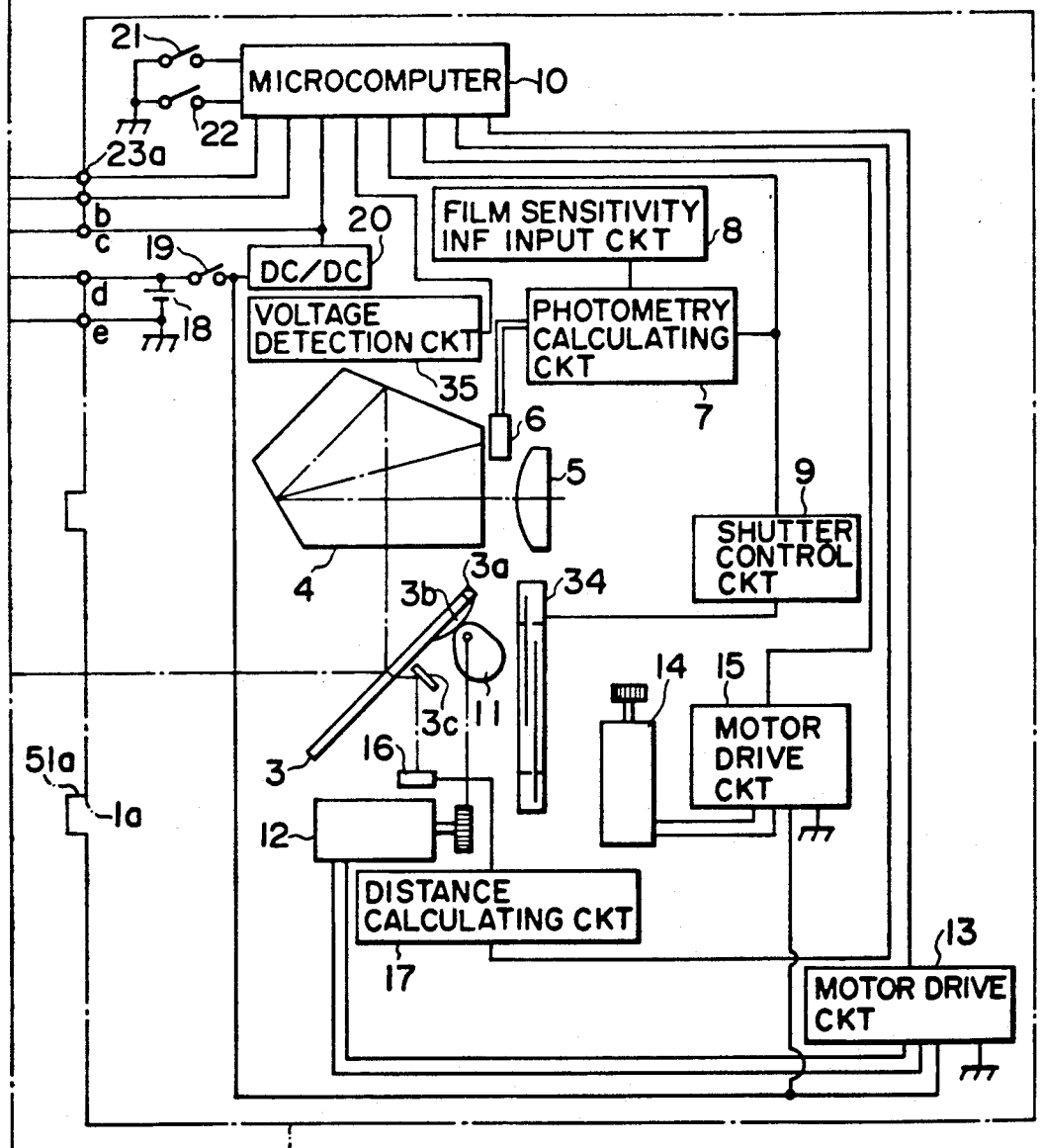

FIG. 12 is a schematic block diagram showing a main construction of a camera system according to a third embodiment of the present invention. Incidentally, the same or similar elements as those shown in FIG. 1 will be designated by the same reference numerals used in FIG. 1.

In FIG. 12, the reference numerals 64a, 65b denote constant current circuits, the constant current being set to have a value of ½ of the currents consumed by the lens driving motor 53 and the zoom driving motor 57. The reference numerals 66, 67 denote switches which can be opened in response to the command from the microcomputer 55.

Either the AF driving or the power zoom driving is to be performed, the switches 66, 67 is maintained in the ON conditions so that the normal driving is performed. On the other hand, when the AF driving and the power zoom driving are simultaneously performed, the switches 66, 67 are changed to the OFF conditions so that the ½ of the current is applied to the respective motor 53 and 57.

In the above mentioned second and third embodiments, even if the AF driving and the zoom driving are performed simultaneously, the consumed current corresponds to the current consumed by a single motor. Accordingly, the battery 18 may be small-sized, and, thus, it is possible to make the camera system more small-sized and lighter, and to meet the requirements regarding substantially all of the shutter chances. Further, since the consumed current is small even when the AF driving and the zoom driving are simultaneously performed, it is possible to solve the problem that the correct or normal photo-taking cannot be effected.

Figure 13B:
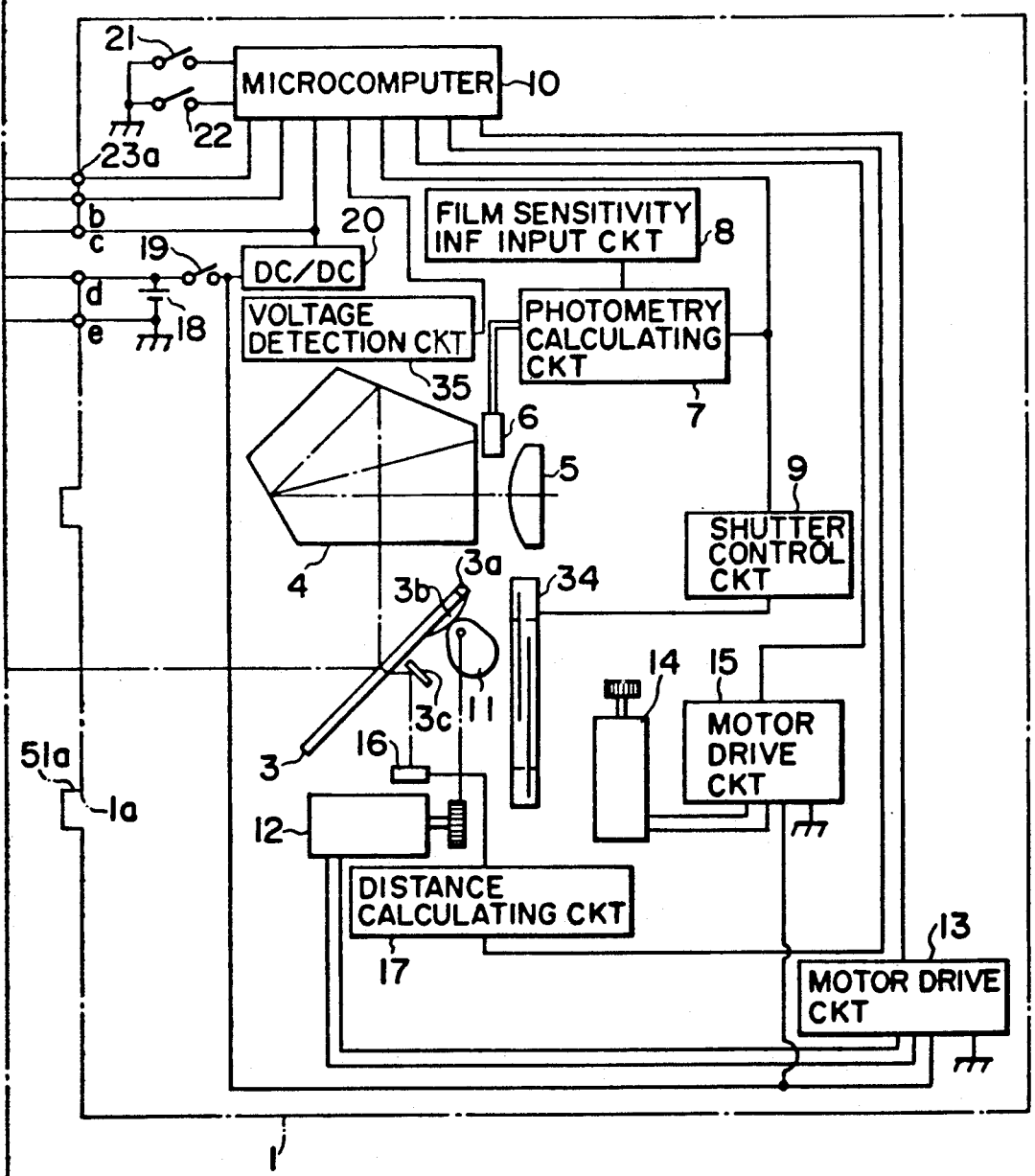
FIG. 13 shows FIGS. 13A and 13B together which is a block diagram showing a main construction of a camera system according to a fourth embodiment of the present invention.

FIG. 13 is a schematic block diagram showing a main construction of a camera system according to a fourth embodiment of the present invention. Incidentally, the same or similar elements as those shown in FIG. 1 will be designated by the same reference numerals used in FIG. 1.

In FIG. 12, the reference numeral 68 denotes a voltage detecting circuit for monitoring the voltage (of the battery 18) on a power source line, which is applied from the camera body side 1 to the interchangeable lens side 50. The voltage detecting circuit may comprise a conventional A/D converter and the like.

As is known, when the battery 18 is new, it has the largest capacity (electric power) and provides the high voltage at its output terminal. In such a case, it is possible to energize a number of motors simultaneously. However, if the battery becomes old, its terminal voltage is decreased and it will be impossible to energize a number of motors simultaneously. Accordingly, in the illustrated embodiment, when the fact that the voltage on the power source line decreases below a predetermined value by means of the voltage detecting circuit 68, the simultaneous energizations of the plural motors are prevented.

Next, the operation at the interchangeable lens side 50 will be explained with reference to a flow chart.

Figure 14:
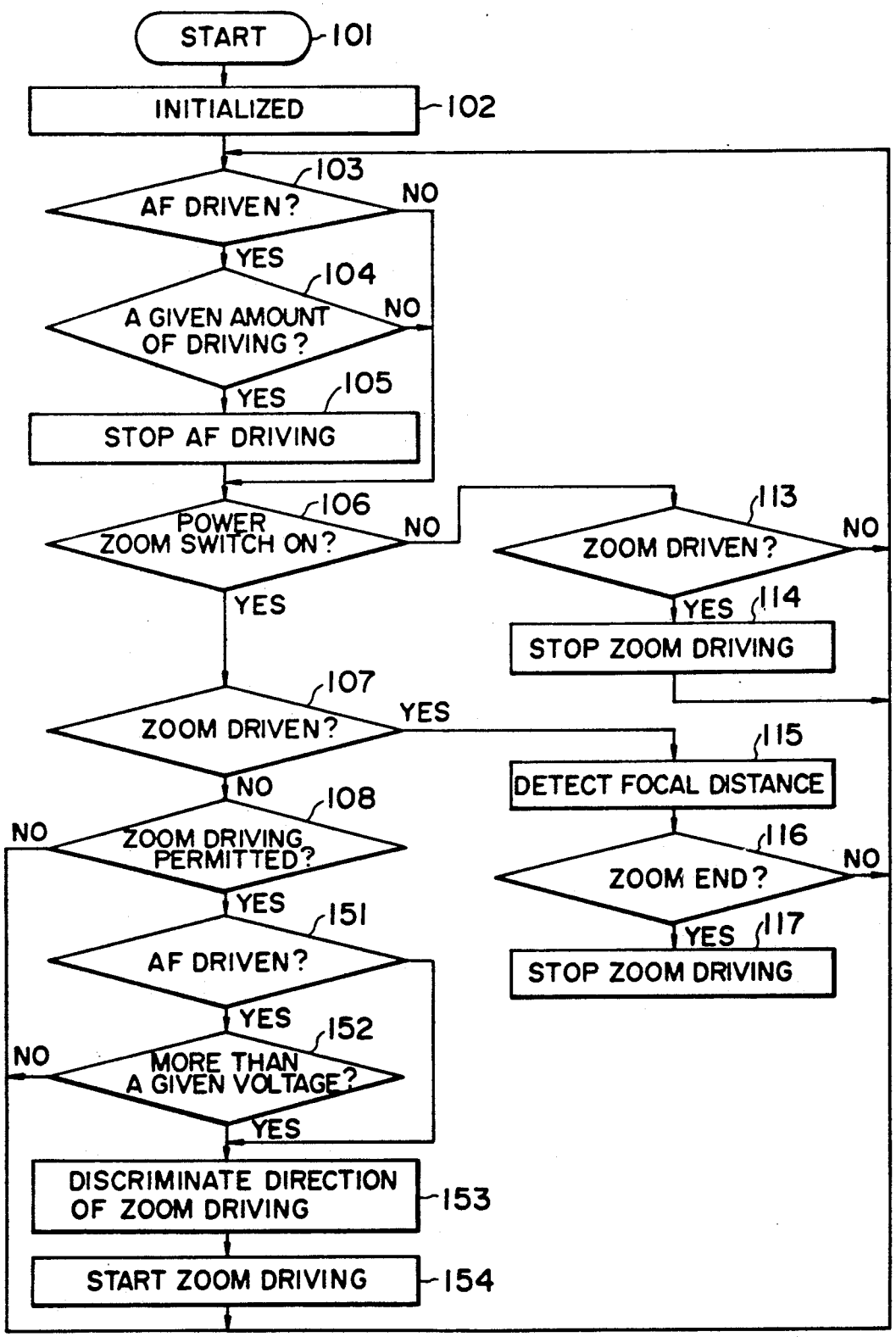
FIGS. 14 and 15 are flow charts showing the operation of the camera system of FIG. 13 at an interchangeable lens side.

FIG. 14 shows a main flow chart of the microcomputer 55 at the interchangeable lens side 50. From a step 101 to a step 108, and from a step 113 to a step 117, the operation is the same as that of FIG. 8, and, thus, the explanation of thereof will be omitted.

In a step 151, it is judged whether the AF driving is being performed or not. If the AF driving is not performed, the sequence goes to a step 153, whereas, if the AF driving is being performed, the sequence goes to a step 152.

In the step 152, the power source voltage is detected by the voltage detecting circuit 68, and, if the power source voltage is more than a given voltage, since the AF driving and the zoom driving can be performed simultaneously, the sequence goes to the step 153. On the other hand, if the power source voltage is lower than the given voltage, since the AF driving and the zoom driving cannot be performed simultaneously, the AF driving is continued, and then the sequence returns to the step 103 without performing the zoom driving.

In the step 153, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 154.

In the step 154, the zoom driving is performed toward the direction discriminated in the step 153, and then the sequence returns to the step 103, from where the operations mentioned above are repeated.

Next, the operation at the initiation of the AF driving will be explained.

Figure 15:
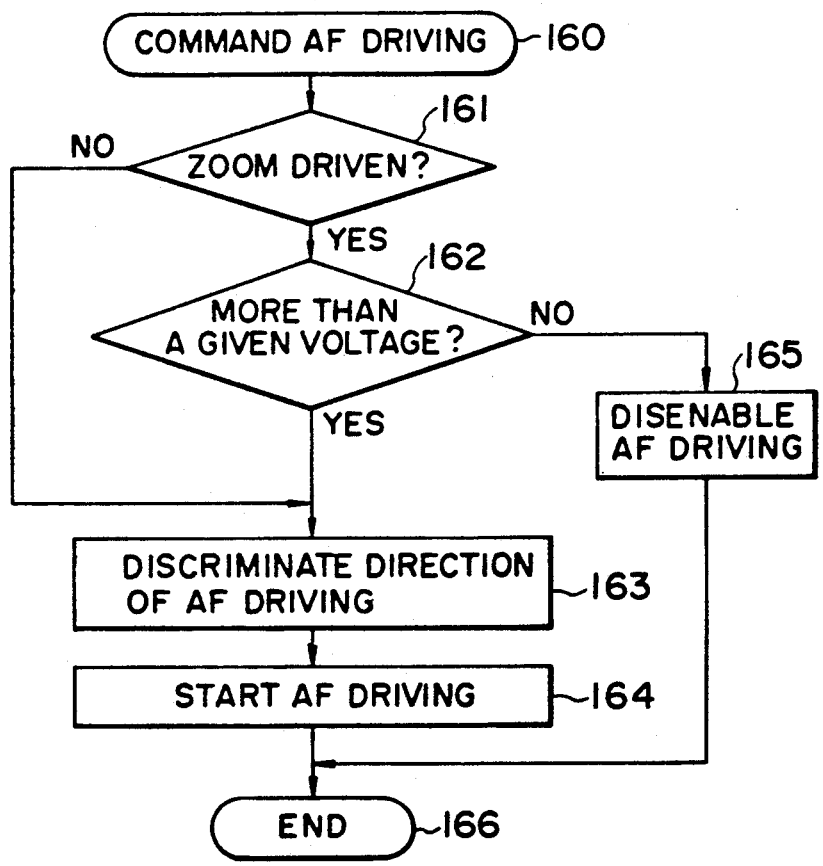

FIG. 15 is a flow chart showing the offering operation regarding the AF driving command.

In a step 160, when the offering of the AF driving command is entered, the sequence goes to a step 161, where it is judged whether the zoom driving is being performed or not. If the zoom driving is not performed, the sequence goes to a step 163, whereas, if the zoom driving is being performed, the sequence goes to a step 162.

In the step 162, if the power source voltage is more than the given voltage, since the AF driving and the zoom driving can be performed simultaneously, the sequence goes to the step 163. On the other hand, if the power source voltage is below the given voltage, since the AV driving and the zoom driving cannot be performed simultaneously, the zoom driving is continued. Thereafter, the sequence goes to a step 165 without executing the AF driving, where the signal representing the fact that the AF driving cannot be performed is sent to the microcomputer 10 of the camera body 1, and then goes to a step 166, where the offering operation is finished.

In the step 163, the driving direction sent from the camera body 1 is discriminated. Then, the sequence goes to a step 164 where the AF driving is started, and then goes to the step 166, thus finishing the offering operation.

In the above second and third embodiments of the invention, even if the AF driving and the zoom driving were performed simultaneously, the consumed current corresponded to the current consumed by a single motor. Accordingly, the battery might be small-sized, and, thus, it was possible to make the camera system more small-sized and to increase the number of pictures to be taken due to the lesser energy consumption.

According to the fourth embodiment of the present invention, since when the power source voltage is high (in other words, when the battery is new) the simultaneous execution of the AF driving and the zoom driving is permitted and when the power source voltage is decreased (i.e., when the battery becomes old) the simultaneous execution of the AF driving and the zoom driving is prohibited, the power source can be effectively utilized and a small battery 18 can be used, thus making the camera system itself small-sized. Further, since the camera system is so constructed that at least the photo-taking operation can be effected even if the power source voltage is decreased, the number of pictures to be taken will be increased.

Further, in the above-mentioned second and third embodiments, while the camera system was constructed that the consumed current corresponded to the current consumed by a single motor when the AF driving and the zoom driving were simultaneously performed, by using the duty control or the constant current control (which may be the constant voltage control), it may include a voltage detecting circuit as shown in the fourth embodiment and may be constructed that the above controls are carried out only when the fact that the power source voltage is decreased below the predetermined value is detected by the voltage detecting circuit. In this way, the camera can meet the requirements regarding substantially all of the shutter chances.

Further, in the fourth embodiment, while an example that the compactness of the camera system can be attained by prohibiting the simultaneous execution of the AF driving and the zoom driving when the power source voltage is below the predetermined value was explained, the camera system may include any circuits for performing the duty control and/or the constant current control shown in the second and third embodiments and may be constructed that such controls are carried out when the power source voltage is maintained between a first predetermined value and a second predetermined value smaller than the first one. In this way, the camera system can meet the requirements regarding substantially all of the shutter chances more effectively in comparison with the camera system of the fourth embodiment.

Further, in the above-mentioned second and third embodiments, while means for performing the duty control and/or the constant current control were arranged at the interchangeable lens side 50, these means may be arranged at the camera body side 1. Similarly, in the fourth embodiment, while the voltage detecting circuit was arranged at the interchangeable lens side 50, it may be arranged at the camera body side 1.

As mentioned above, according to the second, third and fourth embodiments of the present invention, by providing the drive control means for carrying out the AF driving and the zoom driving with the consumption current smaller than that consumed by simultaneously and independently performing the AF and zoom drivings, the simultaneous execution of the power zoom driving and the AF driving can be effected with the current which is equal to the current consumed by performing either one of these drivings; and by providing the power source voltage detecting means for discriminating whether the voltage of the battery is more or below than the predetermined value, and the operation control means for prohibiting the simultaneous execution of the power zoom and AF drivings when the fact that the power source voltage is below the predetermined value is detected by the voltage detecting means, either of the AF driving or the power zoom driving can be prevented when the power source voltage is below the predetermined value so that the small battery can be effectively used. Accordingly, it is possible to solve the problem that the normal photo-taking cannot be carried out, to make the camera system more small-sized and lighter, and to make the camera system stronger with respect to the shutter chances.

Next, a fifth embodiment of the present invention will be explained.

Since the construction of the camera system according to the fifth embodiment is substantially the same as that shown in FIG. 1 except that the microcomputer 10 does not include the large current consumption detecting section 10a and the lens movement control section 10b, the detailed explanation thereof will be omitted.

Figure 16:
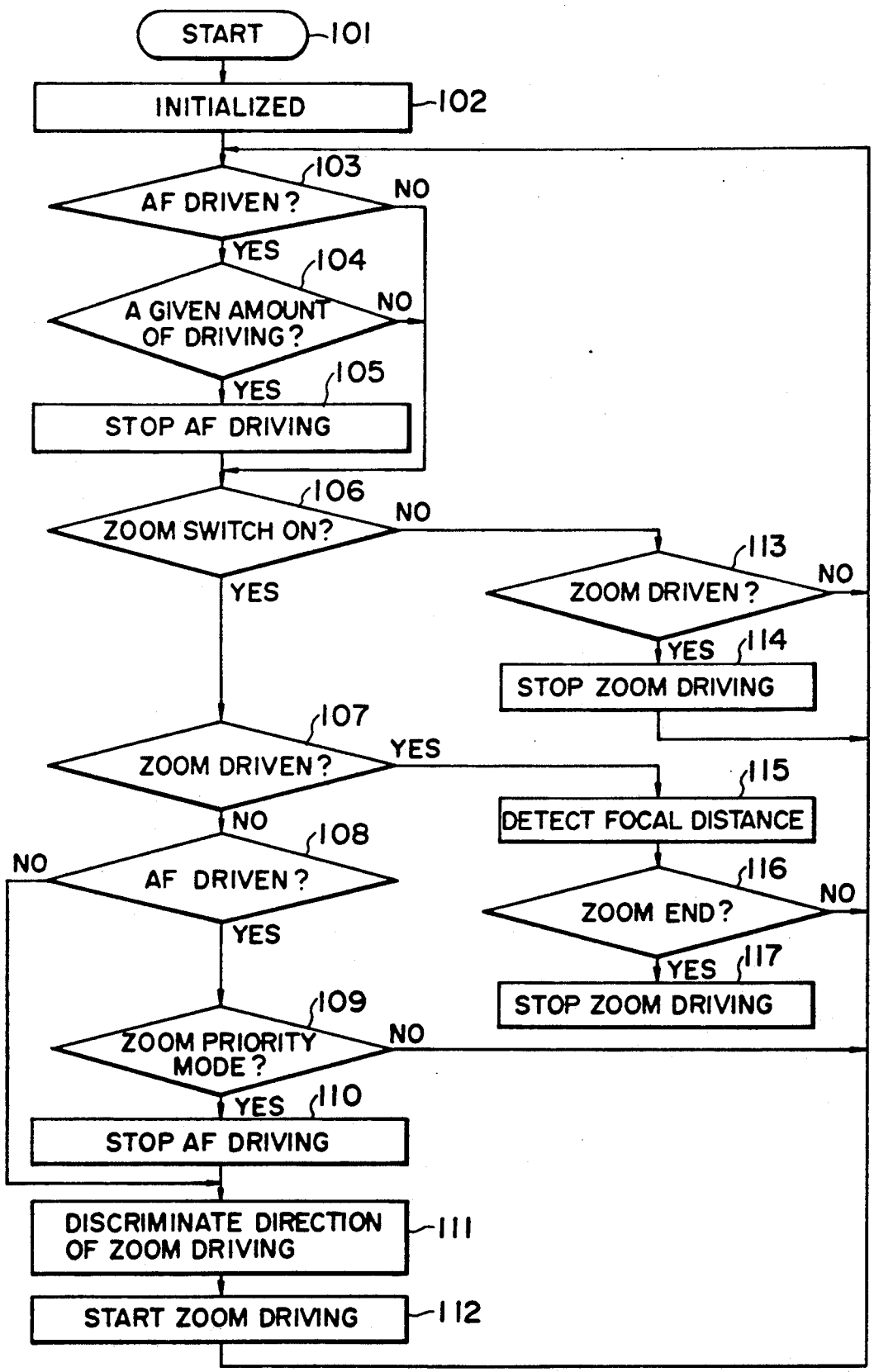
FIG. 16 is a flow chart showing the operation of a camera system according to a fifth embodiment of the present invention.

Hereinafter, the fifth embodiment of the invention will be fully explained with reference to a main flow chart of the microcomputer 55 at the interchangeable lens side 50 as shown in FIG. 16.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed or not. If the AF driving is being performed, the sequence goes to a step 104, otherwise, to a step 106.

In the step 104, the value in the counter is read to determine the AF driving amount, and the read value is compared with a desired AF driving amount sent from the camera body side 1. If the read value reaches the desired amount, the sequence goes to a step 105 where the AF driving is stopped, and then goes to the step 106. On the other hand, if the read value does not reach the desired AF driving amount, the sequence goes to the step 106.

In the step 106, the condition of the power zoom switch 63 is judged, and if the switch is turned ON either a side or c side, the sequence goes to a step 107; whereas, if the switch is turned OFF, the sequence goes to a step 113.

In the step 113, it is judged whether the zoom driving is being performed or not. If the zoom driving is not performed, the sequence returns to the step 103 and the operations mentioned above is repeated. On the other hand, if the zoom driving is being performed, the sequence goes to a step 114 where the zoom driving is stopped, and then returns to the step 103.

If the power zoom switch is turned ON in the step 106, the sequence goes to the step 107, where it is judged whether the zoom driving is being performed or not. If the zoom driving is being performed, the sequence goes to a step 115 where the focal length is detected from the encoder 59 for detecting the focal length of the lens, and then goes to a step 116.

In the step 116, if the focal length being detected is situated in the zoom end toward which the zoom driving is directed, since a further zoom driving cannot be effected, the sequence goes to a step 117 where the zoom driving is stopped, and then returns to the step 103. On the other hand, if the focal length is not situated in the zoom end toward which the zoom driving is directed, the zoom driving is further continued, and then the sequence returns to the step 103.

If the zoom driving is not performed in the step 107, the sequence goes to a step 108 to initiate the zoom driving.

In the step 108, it is judged whether the AF driving is being performed or not. If the AF driving is not performed, the sequence goes to a step 111, whereas, if the AF driving is being performed, the sequence goes to a step 109.

In the step 109, a condition of the change-over switch 64 is detected and it is judged whether the AF priority mode or the zoom priority mode is available. If the AF priority mode is available, the AF driving is continued without performing the zoom driving, and then the sequence returns to the step 103. On the other hand, if the zoom priority mode is available, the sequence goes to a step 110 where the AF driving is stopped, and then the sequence goes to the step 111.

In the step 111, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 112.

In the step 112, the zoom driving is started to the driving direction determined in the step 111. Then the sequence returns to the step 103, and the sequential operations described above are repeated.

Next, the operation at the initiation of the AF driving will be explained.

When the microcomputer 55 at the interchangeable lens side 50 receives the AF driving command and the AF driving amount from the microcomputer 10 at the camera body side 1 through the communication therebetween, the microcomputer 55 initiates the AF driving by using a known offering technique.

Since a flow chart showing the offering operation regarding the AF driving command is the same as that shown in FIG. 4, the explanation thereof will be omitted.

According to the fifth embodiment of the present invention, since, in the zoom priority mode, if the AF driving is being performed when the zoom driving should be performed, the AF driving is stopped and the zoom driving is performed (steps 108→109→110 111→... in FIG. 16, and steps 121→122→126→... in FIG. 4), and, in the AF priority mode, if the zoom driving is being performed when the AF driving should be performed, the zoom driving is stopped and the AF driving is performed (steps 121→122→123→124→... in FIG. 4, and steps 108→109→103→... in FIG. 16), i.e., since the simultaneous execution of the power zoom driving and the AF driving is prohibited, the power source can be made small-sized and the normal or correct operation can be ensured. Further, since the power source can be utilized effectively, the number of films which can be properly photo-taken can be increased.

Further, for example, if the zoom driving is carried out while the AF driving is being performed, an image on the distance sensor 16 is varied or changed, which frequently leads in the incorrect distance measuring. However, according to the fifth embodiment of the invention, since the zoom driving is prohibited when the AF priority mode is selected, the image on the distance sensor 16 is not varied, and, thus, it is possible to measure the distance correctly. That is to say, since not only the simultaneous execution of the AF driving and the zoom driving is prohibited but also any one of these drivings can be preferentially performed, it is possible to take a photograph more properly.

As mentioned above, according to the fifth embodiment of the present invention, by providing the operation control means for prohibiting the simultaneous execution of the power zoom driving and the AF driving, the power zoom driving is prohibited while the AF driving is being performed and the AF driving is prohibited while the power zoom driving is being performed; and by providing the selection means for selecting the power zoom priority mode and the AF priority mode, and the priority instructing means for preferentially performing the power zoom driving to the AF driving when the power zoom priority mode is selected and for preferentially performing the AF driving to the power zoom driving when the AF priority mode is selected, the respective driving can be at any desired timing. Accordingly, the small battery can be utilized effectively and it is possible to always carry out the proper photo-taking.

Next, a sixth embodiment of the present invention will be explained.

Prior to the explanation of the construction of the sixth embodiment of the invention, a prior art relating to this embodiment will be explained.

In a conventional photo-taking apparatus of the power zoom type, the following two methods for stopping the zoom driving at the telephoto end and at the wideangle end were adopted.

In the first method, mechanical contact switches such as limit switches are arranged at positions corresponding to the telephoto end and the wide-angle end, and a zoom driving motor is stopped when the fact that a moving member such as a magnification changing lens holder is engaged by the mechanical switch during the zoom driving is detected.

In the second method, the rotating amount of a zoom driving motor during the zoom driving is detected by a conventional encoder as electric pulses, and the zoom driving motor is stopped when the sum of the number of pulses corresponds to a distance up to the telephoto end and wide-angle end.

In case of the above first method, if the switches are positioned with very high accuracy, the magnification changing lens holder can be correctly stopped at the position corresponding to the telephoto end or the wide-angle end. However, in the actual manufacturing process, since it is impossible to position the switches at the desired positions with very high accuracy, the first method leads to the following drawbacks.

That is to say, if the switches are arranged ahead of the telephoto end and/or the wide-angle end, since the switch is activated before the magnification changing lens holder reaches the telephoto end or wide-angle end to stop the zoom driving motor, the magnification changing lens holder will be stopped before it reaches the telephoto end or wide-angle end.

On the other hand, if the switches are arranged beyond the telephoto end and/or the wide-angle end, since the switch is not activated when the magnification changing lens holder reaches the telephoto end or wide-angle end, the energization of the zoom driving motor is continued, with the result that the excessive load is applied to the power transmission mechanism and/or the useless electric power is consumed.

On the other hand, in case of the above second method, since it is necessary to provide a specific motor control circuit for correctly stopping the zoom driving motor when a means for detecting the rotational amount of the zoom driving motor and/or the magnification changing lens reaches the telephoto end or the wide-angle end, the manufacturing cost is increased.

An object of the sixth embodiment of the present invention is to provide an improved zoom driving controlling method which can eliminate the incorrect stop position and avoid the increase in the manufacturing cost.

Hereinafter, the sixth embodiment of the present invention will be fully explained.

Since the construction of the camera system according to the sixth embodiment is substantially the same as that shown in FIG. 1 except that the microcomputer 10 does not include the large current consumption detecting section 10a and the lens movement control section 10b, the detailed explanation thereof will be omitted.

Figure 17:
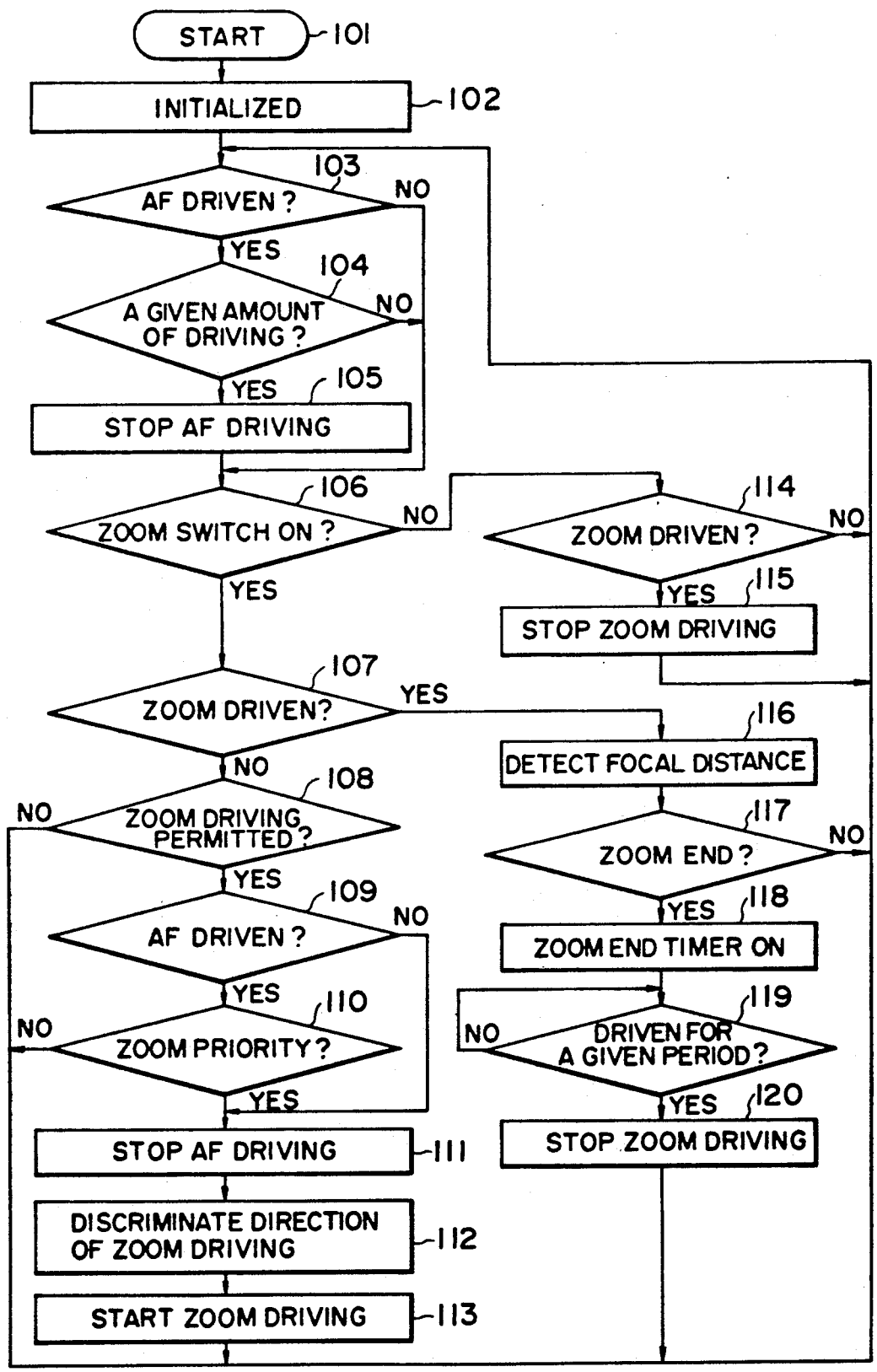
FIG. 17 is a flow chart showing the operation of a camera system according to a sixth embodiment of the present invention.

FIG. 17 shows a main flow chart of the microcomputer 55 at the interchangeable lens side.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed or not. If the AF driving is being performed, the sequence goes to a step 104, otherwise, to a step 106.

In the step 104, the value in the counter 62 us read to determine the AF driving amount, and the read value is compared with a desired AF driving amount sent from the camera body side 1. If the read value reaches the desired amount, the sequence goes to a step 105 where the AF driving is stopped, and then goes to the step 106. On the other hand, if the read value does not reach the desired AF driving amount, the AF driving is continued, and then the sequence goes to the step 106.

In the step 106, the condition of the power zoom switch 63 is judged, and if the switch is turned ON either a side or c side, the sequence goes to a step 107; whereas, if the switch is turned OFF, the sequence goes to a step 114. In the step 114, it is judged whether the zoom driving is being performed or not. If the zoom driving is not performed, the sequence returns to the step 103 and the operations mentioned above is repeated. On the other hand, if the zoom driving is being performed, since the power zoom switch is turned OFF, the sequence goes to a step 115 where the zoom driving is stopped, and then returns to the step 103.

Then, if the power zoom switch is turned ON in the step 106, the sequence goes to the step 107, where it is judged whether the zoom driving is bent performed or not. If the zoom driving is being performed, the sequence goes to a step 116 where the focal length is detected from the encoder 59 for detecting the focal length of the lens, and then goes to a step 117.

In the step 117, the zoom is driven toward the wide-angle side, when the focal length near the wideangle end is detected, since the zoom will soon reach the wide-angle end, the sequence goes to a step 118 where a zoom end timer in the microcomputer is turned ON, and then goes to a step 119. On the other hand, in the step 118, if the focal length is not situated in wide-angle end, the sequence returns to the step 103.

Here, while an example that the zoom is driven toward the wide-angle side was explained, similarly, if the zoom is driven toward the telephoto side, when the fact that the focal length is situated at the telephoto end is detected, the zoom end timer is turned ON, and the sequence goes to the step 119.

In the step 119, it is judged whether the zoom timer turned ON in the step 118 is driven for a given period or not. If not, the sequence returns to the step 119 again. On the other hand, if the timer is driven for the given period, the sequence goes to a step 120, where the zoom driving is stopped.

On the other hand, if the zoom driving is not performed in the step 107, the sequence goes to a step 108 to initiate the zoom driving, where it is judged whether the zoom driving is permitted or prohibited.

If the zoom driving is prohibited, the sequence returns to the step 103, whereas, if the zoom driving is permitted, the sequence goes to a step 109. Incidentally, when the camera body requires the large electric power, the zoom prohibition command is sent from the microcomputer 10 of the camera body to the microcomputer 55 of the interchangeable lens through the serial communication therebetween.

In the step 109, it is judged whether the AF driving is being performed or not. If the AF driving is not performed, the sequence goes to a step 111, whereas, if the AF driving is being performed, the sequence goes to a step 110. In the step 110, a condition of the switch 64 is detected and it is judged whether the AF priority mode or the zoom priority mode is available. If the AF priority mode is available, the AF driving is continued without performing the zoom driving, and then the sequence returns to the step 103. On the other hand, if the zoom priority mode is available, the sequence goes to the step 111 where the AF driving is stopped, and then goes to a step 112.

In the step 112, it is discriminated whether the zoom switch 63 is turned ON either at the a side or at the c side. If the switch is at the a side, it is judged that the driving should be done in the direction toward the telephoto side, whereas, if the switch is at the c side, it is judged that the driving should be done in the direction toward the wide-angle side, and then the sequence goes to a step 113. In the step 113, the zoom driving is started in the driving direction discriminated in the step 112, and then the sequence returns to the step 103, from where the above-mentioned operations are repeated.

As mentioned above, in the zoom driving control method shown in the sixth embodiment of the present invention, since when the focal length detecting means detects the focal length situated nearest the wide-angle end or the telephoto end, the zoom end timer arranged in the microcomputer is turned ON, whereby the zoom driving is stopped for the given period, the zoom driving can be effectively stopped without using any additional elements for detecting the zoom end or without adjusting the zoom end.

What is claimed is:

1. A camera system comprising:
   (a) a zoom driving means driven by a battery as a power source, for varying a focal length of a taking lens;
   (b) at least one other driving means driven by said battery as a power source;
   (c) a detecting means for detecting whether any of said other driving means is being executed or is to be executed; and
   (d) a control means for prohibiting the execution of said zoom driving means when said detecting means detects the fact that any of said other driving means is being executed or is to be executed.

2. A camera system according to claim 1, wherein said control means prohibits simultaneous execution of an auto-focus driving means and said zoom driving means.

3. A camera system according to claim 1, wherein said control means prohibits simultaneous execution of an aperture-stop driving means and said zoom driving means.

4. A camera system according to claim 1, wherein said control means prohibits simultaneous execution of a mirror driving means and said zoom driving means.

5. A camera system according to claim 1, wherein said control means prohibits simultaneous execution of a shutter charging means and said zoom driving means.

6. A camera system according to claim 1, wherein said control means prohibits simultaneous execution of a film feeding means and said zoom driving means.

7. A camera body on which an interchangeable lens having a zoom driving means driven by a motor and adapted to vary a focal length is mountable, comprising:
   (a) a power source means acting as a power source for said zoom driving means;
   (b) a supply means for supplying power from said power source means to said interchangeable lens;
   (c) a first driving means driven by said power from said power source means;
   (d) a detecting means for detecting whether said first driving means is being executed or said first driving means is to be executed; and
   (e) a control means for outputting a signal representative of the prohibition of execution of said zoom driving means to said interchangeable lens, when said detecting means detects the fact that said first driving means is being executed or that said first driving means is to be executed.

8. A camera body according to claim 7, wherein said interchangeable lens can be electrically connected to said camera body through a plurality of contacts.

9. A camera body according to claim 7, wherein said first driving means comprises a mirror driving means.

10. A camera body according to claim 7, wherein said first driving means comprises a shutter charging means.

11. A camera body according to claim 7, wherein said first driving means comprises a film feeding means.

12. An interchangeable lens mountable on a camera body having a power source means, a supply means for supplying power from said power source means to said interchangeable lens, a first driving means driven by said power from said power source means, and a control means for outputting a signal representative of the prohibition to said interchangeable lens when said first driving means being executed or is to be executed so that said first driving means and a second driving means provided in said interchangeable lens are not executed simultaneously, comprising:
   (a) a zoom driving means driven by said power from said power source means, for varying a focal length of said interchangeable lens; and
   (b) a second control means for controlling the execution of said zoom driving means, said second control means prohibiting the execution of said zoom driving means when it receives said signal representative of prohibition.

13. An interchangeable lens according to claim 12, wherein said interchangeable lens can be electrically connected to said camera body through a plurality of contacts.

14. An interchangeable lens according to claim 12, wherein said first driving means comprises a mirror driving means.

15. An interchangeable lens according to claim 12, wherein said first driving means comprises a shutter charging means.

16. An interchangeable lens according to claim 12 wherein said first driving means comprises a film feeding means.

17. A camera body on which an interchangeable lens having a zoom driving means driven by a motor and adapted to vary a focal length and at least one other driving means is mountable, comprising:
   (a) a power source means acting as a power source for said zoom driving means and said other driving means;
   (b) a supply means for supplying power from said power source means to said interchangeable lens;
   (c) a detecting lens for detecting whether any of said other driving means is being executed or is to be executed; and
   (d) a control means for outputting a signal representative of the prohibition of execution of said zoom driving means to said interchangeable lens, when said detecting means detects the fact that any of said other driving means is being executed or is to be executed.

18. A camera body according to claim 17, wherein said interchangeable lens can be electrically connected to said camera body through a plurality of contacts.

19. A camera body according to claim 17, wherein said other driving means comprises an auto-focus driving means.

20. A camera body according to claim 17, wherein said other driving means comprises a stop driving means.

21. An interchangeable lens mountable on a camera body having a power source means, a supply means for supplying power from said power source means to said interchangeable lens, and a control means for supplying a signal representative of the prohibition to said interchangeable lens so that a first driving means and a second driving means each driven by said power from said power source means and arranged in said interchangeable lens are not executed simultaneously wherein;
   (a) said first driving means can vary a focal length of said interchangeable lens; and, comprising:
   (b) a second control means for controlling the execution of said first driving means, said second control means inhibiting the execution of said first driving means when it receives said signal representative of prohibition.

22. An interchangeable lens according to claim 21, wherein said second driving comprises an auto-focus driving means.

23. An interchangeable lens according to claim 21, wherein said second driving comprises a stop driving means.

24. An interchangeable lens according to claim 21, wherein said interchangeable lens can be electrically connected to said camera body through a plurality of contacts.

25. A camera system comprising:
   (a) a zoom driving means driven by a battery as a power source, for varying a focal length of a taking lens;
   (b) at least one other driving means driven by said battery as a power source; and (c) a control means for executing said zoom driving means and said at least one other driving means, respectively, with consumption current smaller than that consumed by executing said zoom driving means of any of said other driving means solely, when said zoom driving means and any of said other driving means are simultaneously executed.

26. A camera system according to claim 25, wherein said control means executes said zoom driving means and said other driving means at a low speed when these driving means are simultaneously executed.

27. A camera system according to claim 25, wherein said other driving means comprises an auto-focus driving means.

28. A camera system according to claim 27, wherein said control means executes said zoom driving means and said auto-focus driving means at a low speed when these driving means are simultaneously executed.

29. A camera body on which an interchangeable lens having a zoom driving means driven by a motor and adapted to vary a focal length and at least one other driving means is mountable, comprising:
(a) a power source means acting as a power source for said zoom driving means;
(b) a supply means for supplying power from said power source means to said interchangeable lens; and
(c) a control means for executing said zoom driving means and said other driving means, respectively, with consumption current smaller than that consumed by executing said zoom driving means or said other driving means solely, when said zoom driving means and any of said other driving means is simultaneously executed.

30. A camera system according to claim 29, wherein said control means executes said zoom driving means and said other driving weans at a low speed when these driving means are simultaneously executed.

31. A camera system according to claim 29, wherein said other driving means comprises an auto-focus driving means.

32. A camera system according to claim 31, wherein said control means executes said zoom driving means and said auto-focus driving means at a low speed when these driving means are simultaneously executed.

33. An interchangeable lens mountable on a camera body having a power source means, a supply means for supplying power from said power source means to said interchangeable lens, and a control means for supplying a signal for executing two driving means arranged in said interchangeable lens respectively with consumption current smaller than that consumed by executing said driving means solely when these two driving means are simultaneously executed, to said interchangeable lens, comprising:
(a) a zoom driving means driven by said power from said power source means, for varying a focal length of said interchangeable lens;
(b) at least one other driving means driven by said power from said power means; and
(c) a second control means for executing said zoom driving means and said at least one other driving means, respectively, with consumption current smaller than that consumed by executing said zoom driving means or any of said other driving means solely, when it receives said signal.

34. A camera system according to claim 33, wherein said second control means executes said zoom driving means and said other driving means at a low speed when these driving means are simultaneously executed.

35. A camera system according to claim 33, wherein said other driving means comprises an auto-focus driving means.

36. A camera system according to claim 35, wherein said second control means executes said zoom driving means and said auto-focus driving means at a low speed when these driving means are simultaneously executed.

37. A camera system comprising:
(a) a zoom driving means driven by a battery as a power source, for varying a focal length of a taking lens;
(b) at least one other driving means driven by said battery as a power source;
(c) a detecting means for detecting a voltage level of said battery; and
(d) a control means for prohibiting the simultaneous execution of said zoom driving means and any of said other driving means when said detecting means detects the fact that said voltage level is below a predetermined value.

38. A camera system according to claim 37, wherein said other driving means comprises an auto-focus driving means.

39. A camera body on which an interchangeable lens having a zoom driving means driven by a motor and adapted to vary focal length and at least one other driving means is mountable, comprising:
(a) a power source means acting as a power source for said zoom driving means;
(b) a supply means for supplying power from said power source means to said interchangeable lens;
(c) a detecting means for detecting a voltage level of said battery; and
(d) a control means for prohibiting the simultaneous execution of said zoom driving means and said other driving means when said detecting means detects the fact that said voltage level is below a predetermined value.

40. An interchangeable lens mountable on a camera body having a power source means, a supply means for supplying power from said power source means to said interchangeable lens, a detecting means for detecting a voltage level of said power source means, and a control means for supplying a signal for prohibiting the simultaneous execution of two driving means when said detecting means detects the fact that said voltage level is below a predetermined value, to said interchangeable lens, comprising:
(a) a zoom driving means driven by said power from said power source means, for varying a focal length of said interchangeable lens; and
(b) at least one other driving means driven by said power from said power source means; and
(c) a second control means for prohibiting the simultaneous execution of said zoom driving means and any of said other driving means when it receives said signal.

41. An interchangeable lens according to claim 40, wherein other driving means comprises an auto-focus driving means.

* * * * *

UNITED STATES PATENT AND TRADEMARK OFFICE
CERTIFICATE OF CORRECTION

PATENT NO. : 5,113,210
DATED : May 12, 1992
INVENTOR(S) : Kashiyama et al.

It is certified that error appears in the above-identified patent and that said Letters Patent is hereby corrected as shown below:

SHEET 3 OF THE DRAWINGS:

In Fig. 2A, "/DISTARCE" should read --/DISTANCE--.

COLUMN 1:

Line 18, "been" should be deleted;
Line 25, "a" should be deleted;
Line 28, "weighted" should read --weighty--;
Line 37, "light-weighting of a" should read --a light-weighted--; and
Line 44, "light-weighting of a" should read --a light-weighted--.

COLUMN 3:

Line 64, "hold" should read --held--.

COLUMN 4:

Line 7, "where" should read --there--.

COLUMN 5:

Line 7, "operations" should read --operation--.

COLUMN 7:

Line 8, "the (second occurrence) should be deleted;
Line 18, "loosing" should read --losing--;
Line 21, "the (second occurrence) should be deleted;
Line 25, "unpinted" should read --unprinted--;

UNITED STATES PATENT AND TRADEMARK OFFICE
CERTIFICATE OF CORRECTION

PATENT NO. : 5,113,210

DATED : May 12, 1992

INVENTOR(S) : Kashiyama et al.

It is certified that error appears in the above-identified patent and that said Letters Patent is hereby corrected as shown below:

Line 38, "includes" should read --include--;
    Line 44, "the providing" should be deleted; and
    Line 51, "to" should read --to perform--.

COLUMN 9:

Line 12, "operations" should read --operation--;
    Line 59, "to" should read --in--; and
    Line 66, "to" should read --in--.

COLUMN 10:

Line 26, "to" should read --in--.

COLUMN 11:

Line 22, "Either" should read --When--;
    Line 23, "is: should read --are--;
    Line 29, "motor" should read --motors--; and
    Line 56, "high" should read --highest--.

COLUMN 12:

Line 5, "of" should be deleted.

COLUMN 13:

Line 19, "that" should read --such that--;
    Line 25, "that" should read --such that--; and

UNITED STATES PATENT AND TRADEMARK OFFICE
CERTIFICATE OF CORRECTION

PATENT NO. : 5,113,210  
DATED : May 12, 1992  
INVENTOR(S) : Kashiyama et al.

It is certified that error appears in the above-identified patent and that said Letters Patent is hereby corrected as shown below:

Line 67, "below" should read --less--.

COLUMN 14:

Line 11, "stronger" should read --perform stronger--; and  
   Line 49, "operations" should read --operation--.

COLUMN 15:

Line 58, "properly photo-taken" should read --properly photographed; and  
   Line 62, "in the" should read --to--.

COLUMN 17:

Line 29, "us" should read --is--; and  
   Line 52, "bent" should read --being--.

COLUMN 19:

Line 53, "means being" should read --means is being--.

UNITED STATES PATENT AND TRADEMARK OFFICE
CERTIFICATE OF CORRECTION

PATENT NO. : 5,113,210
DATED : May 12, 1992
INVENTOR(S) : Kashiyama et al.

It is certified that error appears in the above-identified patent and that said Letters Patent is hereby corrected as shown below:

COLUMN 20:

Line 54, "second driving" should read --second driving means--.

COLUMN 21:

Line 39, "weans" should read --means--.

COLUMN 22:

Line 65, "other driving means" should read --said other driving means--.

Signed and Sealed this

Seventh Day of December, 1993

Attest:

BRUCE LEHMAN

Attesting Officer

Commissioner of Patents and Trademarks